United States Patent
Shi

(10) Patent No.: US 9,196,199 B2
(45) Date of Patent: Nov. 24, 2015

(54) DISPLAY HAVING STAGGERED DISPLAY ELEMENT ARRANGEMENT

(71) Applicant: Pixtronix, Inc., San Diego, CA (US)

(72) Inventor: Jianru Shi, Haverhill, MA (US)

(73) Assignee: Pixtronix, Inc., San Diego, CA (US)

( * ) Notice: Subject to any disclaimer, the term of this patent is extended or adjusted under 35 U.S.C. 154(b) by 175 days.

(21) Appl. No.: 13/765,391

(22) Filed: Feb. 12, 2013

(65) Prior Publication Data

US 2014/0225816 A1  Aug. 14, 2014

(51) Int. Cl.
*G09G 3/34* (2006.01)
*G02B 26/08* (2006.01)
*G09G 3/36* (2006.01)

(52) U.S. Cl.
CPC .......... *G09G 3/3433* (2013.01); *G02B 26/0833* (2013.01); *G02F 2201/40* (2013.01); *G09G 3/348* (2013.01); *G09G 3/3466* (2013.01); *G09G 3/3611* (2013.01); *G09G 2300/0426* (2013.01); *G09G 2300/0465* (2013.01)

(58) Field of Classification Search
CPC ........... G02F 1/1335; G09G 3/00; G09G 3/22
USPC ........................................................ 345/84
See application file for complete search history.

(56) References Cited

U.S. PATENT DOCUMENTS

| | | | |
|---|---|---|---|
| 7,300,157 B2 | 11/2007 | Conner et al. | |
| 7,733,556 B2 | 6/2010 | Suh et al. | |
| 7,782,409 B2 | 8/2010 | Kean et al. | |
| 2007/0002083 A1 | 1/2007 | Belmon | |
| 2007/0008259 A1 | 1/2007 | Barker | |
| 2007/0070093 A1* | 3/2007 | Lin et al. | 345/694 |
| 2007/0183019 A1* | 8/2007 | Suh et al. | 359/279 |
| 2007/0257872 A1 | 11/2007 | Huibers | |
| 2011/0235147 A1* | 9/2011 | Lee et al. | 359/230 |

FOREIGN PATENT DOCUMENTS

| | | |
|---|---|---|
| EP | 0189214 A2 | 7/1986 |
| EP | 1484743 A2 | 12/2004 |
| EP | 2490451 A1 | 8/2012 |
| TW | I274221 B | 2/2007 |
| WO | 03060870 A1 | 7/2003 |

OTHER PUBLICATIONS

International Search Report and Written Opinion—PCT/US2014/015310,—ISA/EPO—Jun. 2, 2014.
Taiwan Search Report—TW103104149—TIPO—Apr. 2, 2015.

* cited by examiner

*Primary Examiner* — Viet Pham
(74) *Attorney, Agent, or Firm* — Edward A. Gordon; Foley & Lardner LLP

(57) ABSTRACT

This disclosure provides systems, methods and apparatus for improving an aperture ratio of a display apparatus. In particular, display elements are configured to have a length that is greater in one dimension than that in the other dimension. This implementation can reduce overhead costs associated with components such as actuators and actuator circuitry and improves the aperture ratio. Furthermore, display elements within the display apparatus can be arranged in a staggered manner. The staggered arrangement improves the perceived display element density of the display apparatus. In some implementations, the display elements are staggered along the rows of the display apparatus, while in some other implementations, the display elements are staggered along the columns of the display apparatus. In some implementations, multiple image pixels in one dimension are utilized to generate signals for each display elements.

27 Claims, 19 Drawing Sheets

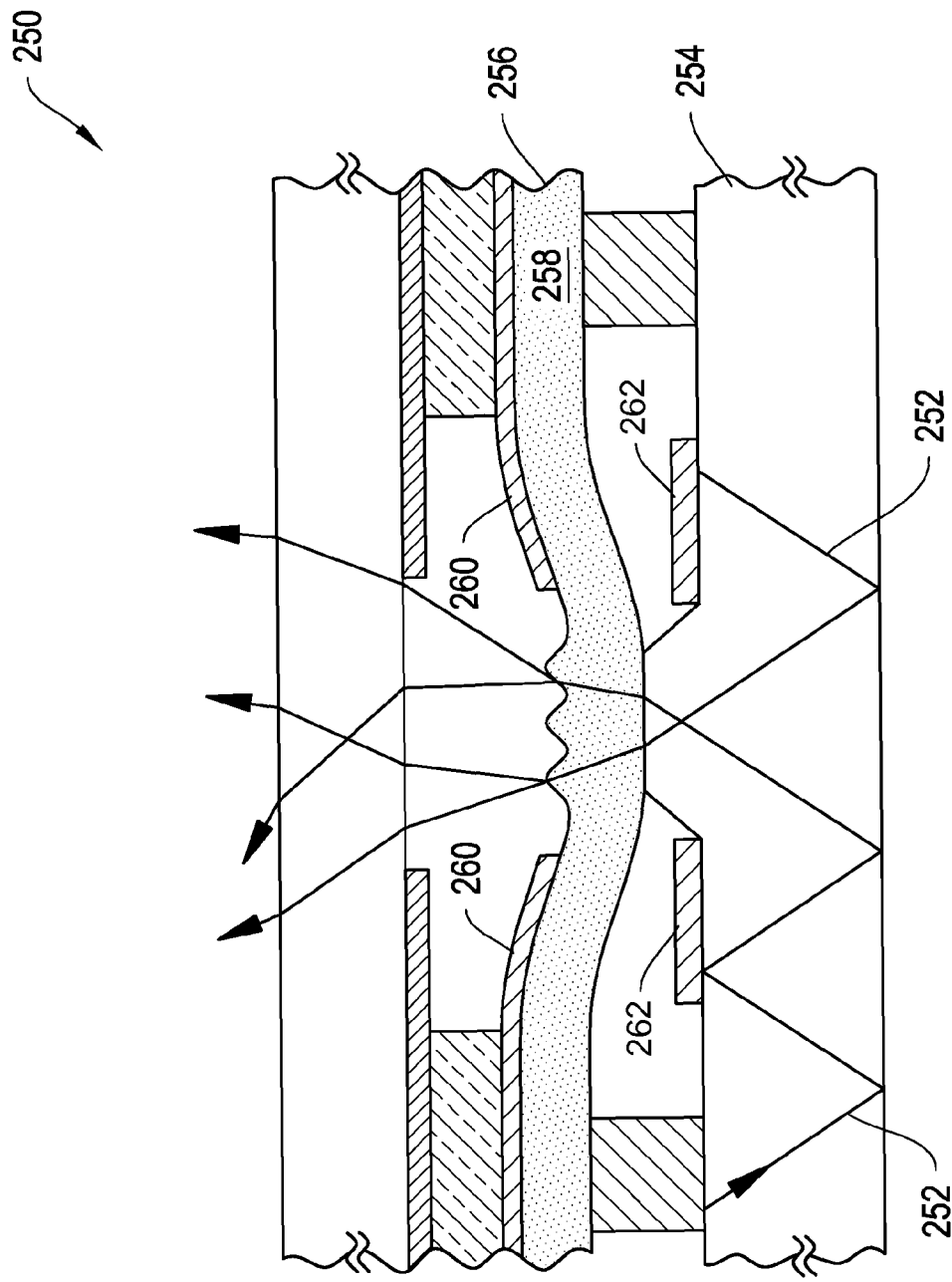

DISPLAY HAVING STAGGERED DISPLAY ELEMENT ARRANGEMENT

TECHNICAL FIELD

This disclosure relates to the field of imaging displays, and in particular to the arrangement of display elements in a display.

DESCRIPTION OF THE RELATED TECHNOLOGY

Display devices can include an array of display elements for rendering an image frame. Each display element can include one or more light emitters or one or more light modulators for generating light or modulating light, respectively, to form the image frame. For example, a display element employing an electromechanical system (EMS) light modulator can include a shutter that moves over an aperture, behind which a light source is placed, to pass, block, or partially block light emitting through the aperture.

The display element also can include additional structures such as actuators for positioning the shutter, electronic components for activating the actuators, etc. These additional components can take up a fair amount of space. As a result, the aperture ratio, and therefore light throughput of the overall display, is reduced. The space overhead allocated to these other components becomes particularly burdensome with higher resolution displays that attempt to fit more display elements into the same area.

SUMMARY

The systems, methods and devices of the disclosure each have several innovative aspects, no single one of which is solely responsible for the desirable attributes disclosed herein.

One innovative aspect of the subject matter described in this disclosure can be implemented in an apparatus having an array of display elements configured to selectively control an output of light corresponding to a first number of pixels of an image frame along a first dimension and a second, smaller number of pixels of the image frame along a second dimension such that the positions of areas allocated to adjacent display elements are offset in the first dimension.

In some implementations, the apparatus includes a plurality of scan-line interconnects, such that the scan-line interconnects are configured to be routed between areas allocated to adjacent display elements. The array of display elements can include rows and columns of display elements, and the rows can be arranged along the first dimension.

In some other implementations, the apparatus includes a plurality of data-line interconnects, such that the data-line interconnects are configured to be routed between areas allocated to adjacent display elements. The array of display elements can include rows and columns of display elements, and the columns can be arranged along the first dimension.

In some implementations, the display elements have an average length along the first dimension and an average length along the second dimension, such that the average length along the first dimension is greater than the average length along the second dimension. In some other implementations, each display element is allocated an area having a length in the first dimension, such that the positions are offset by the length multiplied by a ratio of the second number over the first number. In some implementations, the apparatus also includes data-line interconnects, such that each data-line interconnect couples only to display elements on every nth row, where n is equal to a ratio of the first number over the second number.

In some implementations, the apparatus further includes a plurality of scan-line interconnects, such that each scan-line interconnect couples to display elements in a given row of the apparatus, and such that the scan-line interconnects associated with two adjacent rows are configured to concurrently provide write enabling signals to the coupled display elements. In some implementations, the apparatus further includes a plurality of scan-line interconnects, such that each scan-line interconnect couples to all display elements in two adjacent rows.

In some implementations, a first length associated with an area allocated to each display element, along the first dimension, is twice a second length associated with the area allocated to each display element along the second dimension. In some implementations, each display element includes a microelectromechanical (MEMS) shutter. In some other implementations, the display elements include liquid crystal light modulators.

In some implementations, the apparatus further includes a display including the array of display elements, a processor that is configured to communicate with the display, the processor being configured to process image data, and a memory device that is configured to communicate with the processor. In some implementations, the apparatus further includes a driver circuit configured to send at least one signal to the display, and a controller configured to send at least a portion of the image data to the driver circuit. In some implementations, the apparatus further includes an image source module configured to send the image data to the processor, such that the image source module includes at least one of a receiver, transceiver, and transmitter. In some implementations, the apparatus further includes an input device configured to receive input data and to communicate the input data to the processor. In some implementations, an aspect ratio of each display element is equal to at least one of 2:1, 3:1 and 3:2.

Another innovative aspect of the subject matter described in this disclosure can be implemented in an apparatus having an array of display elements having a first display element density in a first dimension and a second display element density in a second dimension such that the second display element density is different than the first display element density, and where areas allocated to adjacent display elements are offset in the first dimension.

In some implementations, the array of display elements includes rows and columns of display elements, and wherein the rows or the columns are arranged along the first dimension. In some implementations, the display elements have an average length along the first dimension and an average length along the second dimension, and where the average length along the first dimension is twice the average length along the second dimension.

In some implementations, the areas allocated to adjacent display elements are offset in the first dimension by a fraction of an average length of the display elements along the first dimension. In some implementations, the display elements have an aspect ratio substantially equal to at least one of 2:1, 3:1, and 3:2. In some implementations, the display elements include liquid crystal light modulators.

Another innovative aspect of the subject matter described in this disclosure can be implemented in an apparatus having a plurality of light modulating means for outputting light arranged in an array having a first dimension and a second dimension such that areas allocated to adjacent light modulating means are offset in a first dimension, and a controlling means for controlling an output of light from each of the plurality of light modulating means based on a first number of pixels of an image frame along a first dimension and a second, smaller number of pixels of the image frame along a second dimension.

In some implementations, the array of the plurality of light modulating means includes rows and columns of light modulating means, and where the rows are arranged along the first dimension. In some implementations, the apparatus further includes at least one of a plurality of write enabling means for enabling the plurality of light modulating means to respond to data signals associated with an image frame. In some implementations, the write-enabling means can be positioned between areas allocated to adjacent light modulating means, and a plurality of data providing means for providing data signals from the controlling means to the light modulating means. In some implementations, the data providing means are positioned between areas allocated to adjacent light modulating means.

In some implementations, each of the plurality of write enabling means is configured for simultaneously write-enabling two rows of light modulating means. In some other implementations, the areas allocated to adjacent light modulating means are offset in the first dimension by a fraction of an average length of the light modulating means along the first dimension.

Details of one or more implementations of the subject matter described in this specification are set forth in the accompanying drawings and the description below. Although the examples provided in this summary are primarily described in terms of MEMS-based displays, the concepts provided herein may apply to other types of displays, such as liquid crystal displays (LCDs), organic light emitting diode (OLED) displays, electrophoretic displays, and field emission displays, as well as to other non-display MEMS devices, such as MEMS microphones, sensors, and optical switches. Other features, aspects, and advantages will become apparent from the description, the drawings, and the claims. Note that the relative dimensions of the following figures may not be drawn to scale.

BRIEF DESCRIPTION OF THE DRAWINGS

FIG. 2C shows an example cross sectional view of an illustrative non shutter-based MEMS light modulator.

Like reference numbers and designations in the various drawings indicate like elements.

DETAILED DESCRIPTION

Figure 1A:
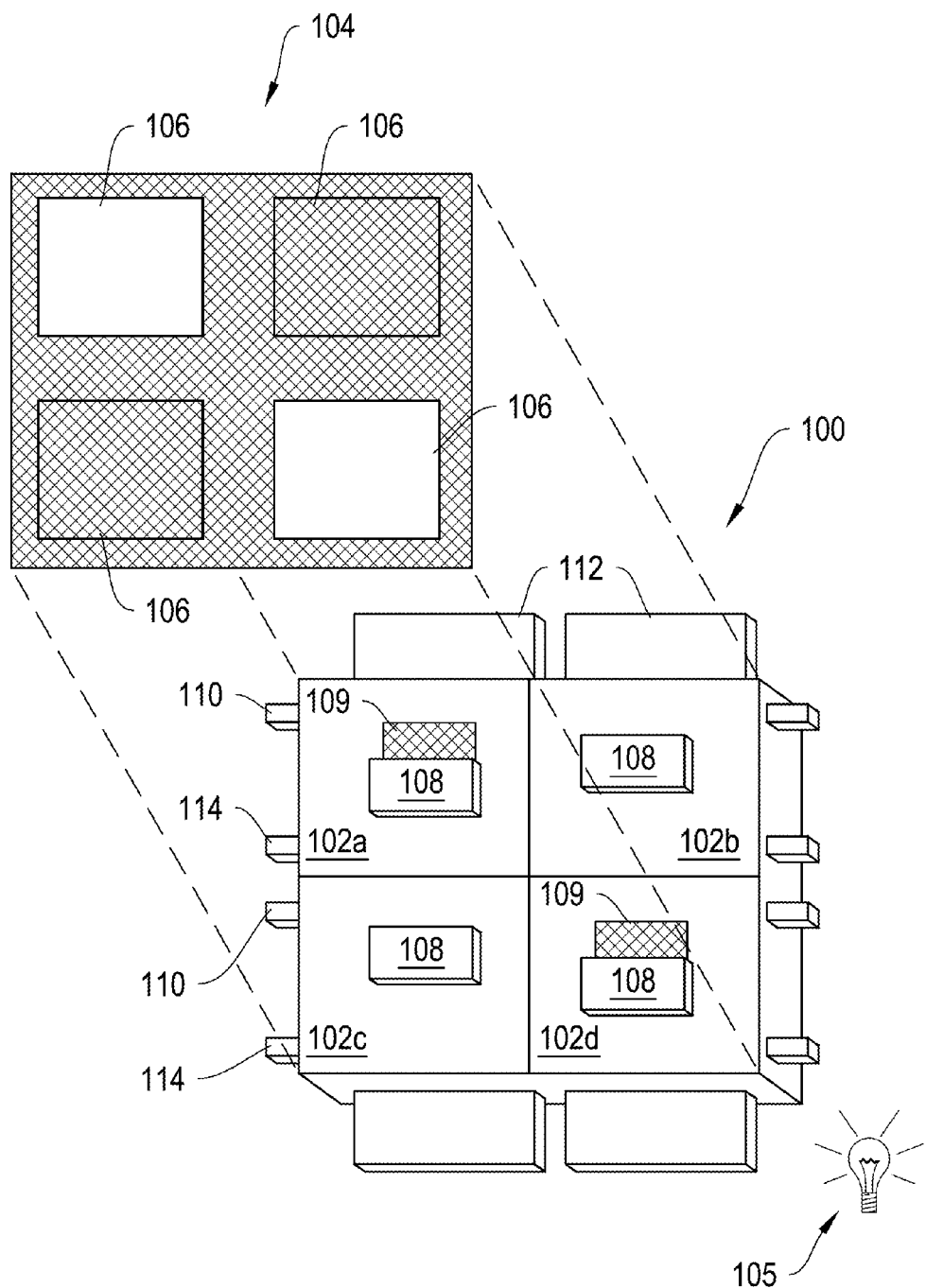
FIG. 1A shows an example schematic diagram of a direct-view microelectromechanical systems (MEMS) based display apparatus.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, apparatus, or system that can be configured to display an image, whether in motion (such as video) or stationary (such as still images), and whether textual, graphical or pictorial. More particularly, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (for example, e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Individual display elements within a display apparatus include components such as apertures, shutters, actuators and actuating circuitry. The area allocated to the actuators and actuation circuitry (also referred to as "area overhead") limits the area that can be allocated to the apertures.

The area overhead can be reduced if multiple display elements are combined to form a single display element. Typical display apparatus include generally square display elements. If such a display apparatus replaced its display elements with elongated (non-square) display elements, each of which replacing two of the generally square display elements, the area overhead of the display apparatus would be cut in half. In doing so, the display apparatus could substantially increase the space it allocates to light emitting apertures, increasing its aperture ratio and therefore its light emitting ability.

Keeping the size of the display apparatus constant, and combining multiple display elements into a single display element may technically reduce the display element density of a display apparatus in at least one dimension. However, the perceived display element density of the display device in that dimension can be regained by arranging the combined display elements in a staggered configuration. For example, the boundaries of display elements in each row may be offset with respect to the boundaries of display elements in an adjacent row, while the boundaries of the display elements in one row are aligned with the boundaries of the display elements in alternate rows. Alternatively, the boundaries of display elements in each column may be offset with respect to the boundaries of display elements in an adjacent column, while the boundaries of the display elements in one column are aligned with the boundaries of the display elements in alternate columns. This staggered arrangement of the display elements along the rows or columns of the display apparatus improves the perceived display element density of the display apparatus, countering the loss of actual display element density caused by combining multiple display elements into a single display element. When arranged in such a staggered fashion, the arrangement of display elements can resemble a brick-wall, with each brick corresponding to one elongated display element.

Particular implementations of the subject matter described in this disclosure can be implemented to realize one or more of the following potential advantages. By displaying multiple image pixels of an image frame using only a single display element, from an array of display elements, area overhead associated with components such as actuators and actuator circuitry can be reduced. The reduction in the area overhead allows a larger proportion of the total area allocated to the display element to be allocated to apertures. This improves the aperture ratio and the light output of the display elements.

In addition, when the display elements are arranged in a staggered manner such that boundaries of areas allocated to two adjacent display elements in two adjacent rows or columns of an array of display elements are offset with respect to each other, the perceived display element density along the rows and columns can be improved. This improvement in the perceived display element density counters any loss in the display element density that may occur due to using single display elements for displaying multiple image pixels.

Furthermore, the staggered arrangement of the display elements along the rows allows the display apparatus to share scan-line interconnects among multiple rows. In addition, multiple rows can be simultaneously enabled (using a shared or separate scan-line interconnects) for their respective display elements to receive their data signals. This results in a reduction in the time required for the display elements of all of the rows to receive their data signals.

FIG. 1A shows a schematic diagram of an example direct-view MEMS-based display apparatus 100. The display apparatus 100 includes a plurality of light modulators 102a-102d (generally "light modulators 102") arranged in rows and columns. In the display apparatus 100, the light modulators 102a and 102d are in the open state, allowing light to pass. The light modulators 102b and 102c are in the closed state, obstructing the passage of light. By selectively setting the states of the light modulators 102a-102d, the display apparatus 100 can be utilized to form an image 104 for a backlit display, if illuminated by a lamp or lamps 105. In another implementation, the apparatus 100 may form an image by reflection of ambient light originating from the front of the apparatus. In another implementation, the apparatus 100 may form an image by reflection of light from a lamp or lamps positioned in the front of the display, i.e., by use of a front light.

In some implementations, each light modulator 102 corresponds to a pixel 106 in the image 104. In some other implementations, the display apparatus 100 may utilize a plurality of light modulators to form a pixel 106 in the image 104. For example, the display apparatus 100 may include three color-specific light modulators 102. By selectively opening one or more of the color-specific light modulators 102 corresponding to a particular pixel 106, the display apparatus 100 can generate a color pixel 106 in the image 104. In another example, the display apparatus 100 includes two or more light modulators 102 per pixel 106 to provide luminance level in an image 104. With respect to an image, a "pixel" corresponds to the smallest picture element defined by the resolution of image. With respect to structural components of the display apparatus 100, the term "pixel" refers to the combined mechanical and electrical components utilized to modulate the light that forms a single pixel of the image.

The display apparatus 100 is a direct-view display in that it may not include imaging optics typically found in projection applications. In a projection display, the image formed on the surface of the display apparatus is projected onto a screen or onto a wall. The display apparatus is substantially smaller than the projected image. In a direct view display, the user sees the image by looking directly at the display apparatus, which contains the light modulators and optionally a backlight or front light for enhancing brightness and/or contrast seen on the display.

Direct-view displays may operate in either a transmissive or reflective mode. In a transmissive display, the light modulators filter or selectively block light which originates from a lamp or lamps positioned behind the display. The light from the lamps is optionally injected into a lightguide or "backlight" so that each pixel can be uniformly illuminated. Transmissive direct-view displays are often built onto transparent or glass substrates to facilitate a sandwich assembly arrangement where one substrate, containing the light modulators, is positioned directly on top of the backlight.

Each light modulator 102 can include a shutter 108 and an aperture 109. To illuminate a pixel 106 in the image 104, the shutter 108 is positioned such that it allows light to pass through the aperture 109 towards a viewer. To keep a pixel 106 unlit, the shutter 108 is positioned such that it obstructs the passage of light through the aperture 109. The aperture 109 is defined by an opening patterned through a reflective or light-absorbing material in each light modulator 102.

The display apparatus also includes a control matrix connected to the substrate and to the light modulators for controlling the movement of the shutters. The control matrix includes a series of electrical interconnects (such as interconnects 110, 112 and 114), including at least one write-enable interconnect 110 (also referred to as a "scan-line interconnect") per row of pixels, one data interconnect 112 for each column of pixels, and one common interconnect 114 providing a common voltage to all pixels, or at least to pixels from both multiple columns and multiples rows in the display apparatus 100. In response to the application of an appropriate voltage (the "write-enabling voltage, $V_{WE}$"), the write-enable interconnect 110 for a given row of pixels prepares the pixels in the row to accept new shutter movement instructions. The data interconnects 112 communicate the new movement instructions in the form of data voltage pulses. The data voltage pulses applied to the data interconnects 112, in some implementations, directly contribute to an electrostatic movement of the shutters. In some other implementations, the data voltage pulses control switches, such as transistors or other non-linear circuit elements that control the application of separate actuation voltages, which are typically higher in magnitude than the data voltages, to the light modulators 102. The application of these actuation voltages then results in the electrostatic driven movement of the shutters 108.

Figure 1B:
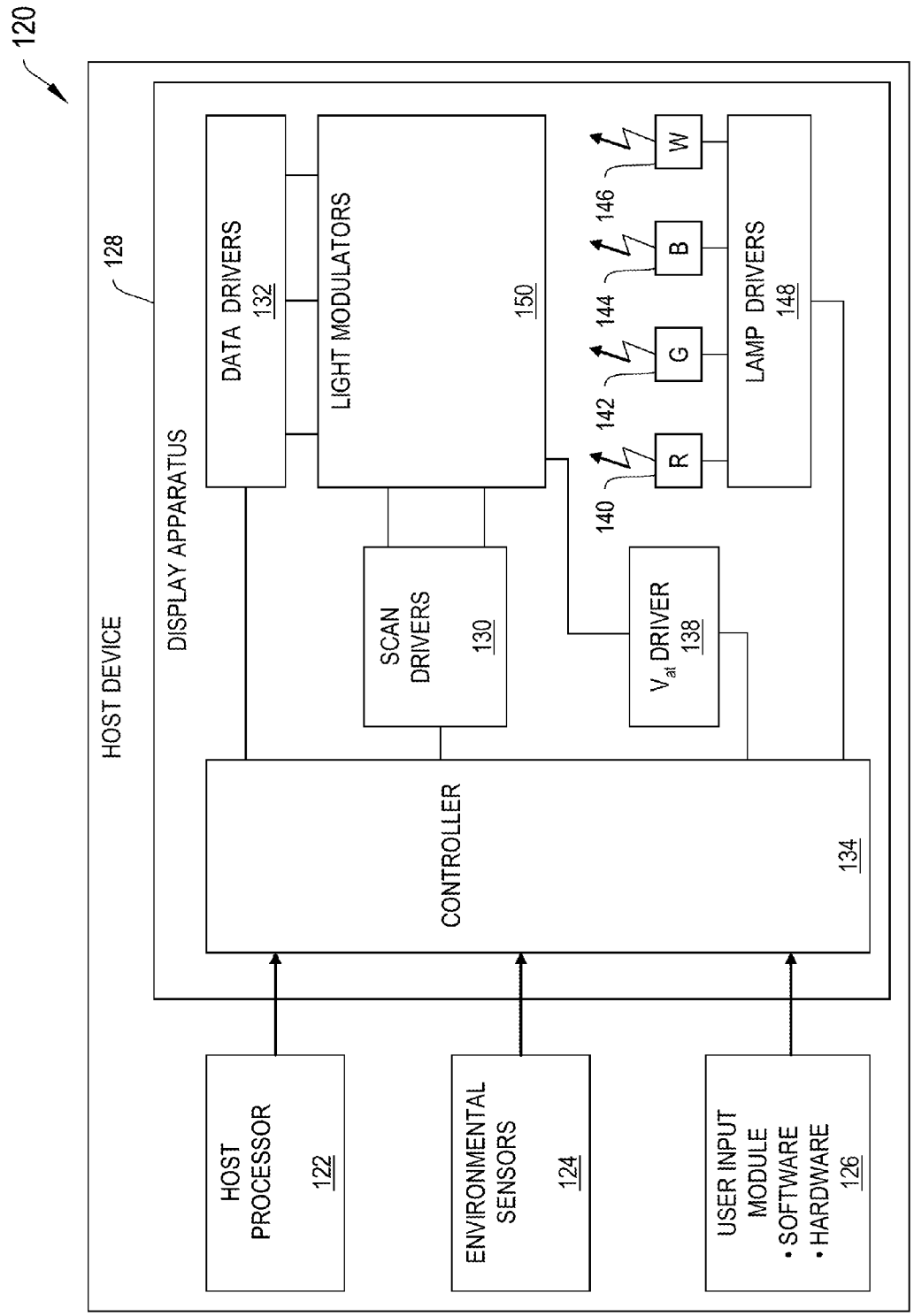
FIG. 1B shows an example block diagram of a host device.

FIG. 1B shows a block diagram of an example host device 120 (i.e., cell phone, smart phone, PDA, MP3 player, tablet, e-reader, netbook, notebook, etc.). The host device 120 includes a display apparatus 128, a host processor 122, environmental sensors 124, a user input module 126, and a power source.

The display apparatus 128 includes a plurality of scan drivers 130 (also referred to as "write enabling voltage sources"), a plurality of data drivers 132 (also referred to as "data voltage sources"), a controller 134, common drivers 138, lamps 140-146, lamp drivers 148 and an array 150 of display elements, such as the light modulators 102 shown in FIG. 1A. The scan drivers 130 apply write enabling voltages to scan-line interconnects 110. The data drivers 132 apply data voltages to the data interconnects 112.

In some implementations of the display apparatus, the data drivers 132 are configured to provide analog data voltages to the array 150 of display elements, especially where the luminance level of the image 104 is to be derived in analog fashion. In analog operation, the light modulators 102 are designed such that when a range of intermediate voltages is applied through the data interconnects 112, there results a range of intermediate open states in the shutters 108 and therefore a range of intermediate illumination states or luminance levels in the image 104. In other cases, the data drivers 132 are configured to apply only a reduced set of 2, 3 or 4 digital voltage levels to the data interconnects 112. These voltage levels are designed to set, in digital fashion, an open state, a closed state, or other discrete state to each of the shutters 108.

The scan drivers 130 and the data drivers 132 are connected to a digital controller circuit 134 (also referred to as the "controller 134"). The controller sends data to the data drivers 132 in a mostly serial fashion, organized in predetermined sequences grouped by rows and by image frames. The data drivers 132 can include series to parallel data converters, level shifting, and for some applications digital to analog voltage converters.

The display apparatus optionally includes a set of common drivers 138, also referred to as common voltage sources. In some implementations, the common drivers 138 provide a DC common potential to all display elements within the array 150 of display elements, for instance by supplying voltage to a series of common interconnects 114. In some other implementations, the common drivers 138, following commands from the controller 134, issue voltage pulses or signals to the array 150 of display elements, for instance global actuation pulses which are capable of driving and/or initiating simultaneous actuation of all display elements in multiple rows and columns of the array 150.

All of the drivers (such as scan drivers 130, data drivers 132 and common drivers 138) for different display functions are time-synchronized by the controller 134. Timing commands from the controller coordinate the illumination of red, green and blue and white lamps (140, 142, 144 and 146 respectively) via lamp drivers 148, the write-enabling and sequencing of specific rows within the array 150 of display elements, the output of voltages from the data drivers 132, and the output of voltages that provide for display element actuation. In some implementations, the lamps are light emitting diodes (LEDs).

The controller 134 determines the sequencing or addressing scheme by which each of the shutters 108 can be re-set to the illumination levels appropriate to a new image 104. New images 104 can be set at periodic intervals. For instance, for video displays, the color images 104 or frames of video are refreshed at frequencies ranging from 10 to 300 Hertz (Hz). In some implementations the setting of an image frame to the array 150 is synchronized with the illumination of the lamps 140, 142, 144 and 146 such that alternate image frames are illuminated with an alternating series of colors, such as red, green, and blue. The image frames for each respective color is referred to as a color subframe. In this method, referred to as the field sequential color method, if the color subframes are alternated at frequencies in excess of 20 Hz, the human brain will average the alternating frame images into the perception of an image having a broad and continuous range of colors. In alternate implementations, four or more lamps with primary colors can be employed in display apparatus 100, employing primaries other than red, green, and blue.

In some implementations, where the display apparatus 100 is designed for the digital switching of shutters 108 between open and closed states, the controller 134 forms an image by the method of time division gray scale, as previously described. In some other implementations, the display apparatus 100 can provide gray scale through the use of multiple shutters 108 per pixel.

In some implementations, the data for an image state 104 is loaded by the controller 134 to the display element array 150 by a sequential addressing of individual rows, also referred to as scan lines. For each row or scan line in the sequence, the scan driver 130 applies a write-enable voltage to the write enable interconnect 110 for that row of the array 150, and subsequently the data driver 132 supplies data voltages, corresponding to desired shutter states, for each column in the selected row. This process repeats until data has been loaded for all rows in the array 150. In some implementations, the sequence of selected rows for data loading is linear, proceeding from top to bottom in the array 150. In some other implementations, the sequence of selected rows is pseudo-randomized, in order to minimize visual artifacts. And in some other implementations the sequencing is organized by blocks, where, for a block, the data for only a certain fraction of the image state 104 is loaded to the array 150, for instance by addressing only every $5^{th}$ row of the array 150 in sequence.

In some implementations, the process for loading image data to the array 150 is separated in time from the process of actuating the display elements in the array 150. In these implementations, the display element array 150 may include data memory elements for each display element in the array 150 and the control matrix may include a global actuation interconnect for carrying trigger signals, from common driver 138, to initiate simultaneous actuation of shutters 108 according to data stored in the memory elements.

In alternative implementations, the array 150 of display elements and the control matrix that controls the display elements may be arranged in configurations other than rectangular rows and columns. For example, the display elements can be arranged in hexagonal arrays or curvilinear rows and columns. In general, as used herein, the term scan-line shall refer to any plurality of display elements that share a write-enabling interconnect.

The host processor 122 generally controls the operations of the host. For example, the host processor 122 may be a general or special purpose processor for controlling a portable electronic device. With respect to the display apparatus 128, included within the host device 120, the host processor 122 outputs image data as well as additional data about the host. Such information may include data from environmental sensors, such as ambient light or temperature; information about the host, including, for example, an operating mode of the host or the amount of power remaining in the host's power source; information about the content of the image data; information about the type of image data; and/or instructions for display apparatus for use in selecting an imaging mode.

The user input module 126 conveys the personal preferences of the user to the controller 134, either directly, or via the host processor 122. In some implementations, the user input module 126 is controlled by software in which the user programs personal preferences such as "deeper color," "better contrast," "lower power," "increased brightness," "sports," "live action," or "animation." In some other implementations, these preferences are input to the host using hardware, such as a switch or dial. The plurality of data inputs to the controller 134 direct the controller to provide data to the various drivers 130, 132, 138 and 148 which correspond to optimal imaging characteristics.

An environmental sensor module 124 also can be included as part of the host device 120.

The environmental sensor module 124 receives data about the ambient environment, such as temperature and/or ambient lighting conditions. The sensor module 124 can be programmed to distinguish whether the device is operating in an indoor or office environment versus an outdoor environment in bright daylight versus an outdoor environment at nighttime. The sensor module 124 communicates this information to the display controller 134, so that the controller 134 can optimize the viewing conditions in response to the ambient environment.

Figure 2A:
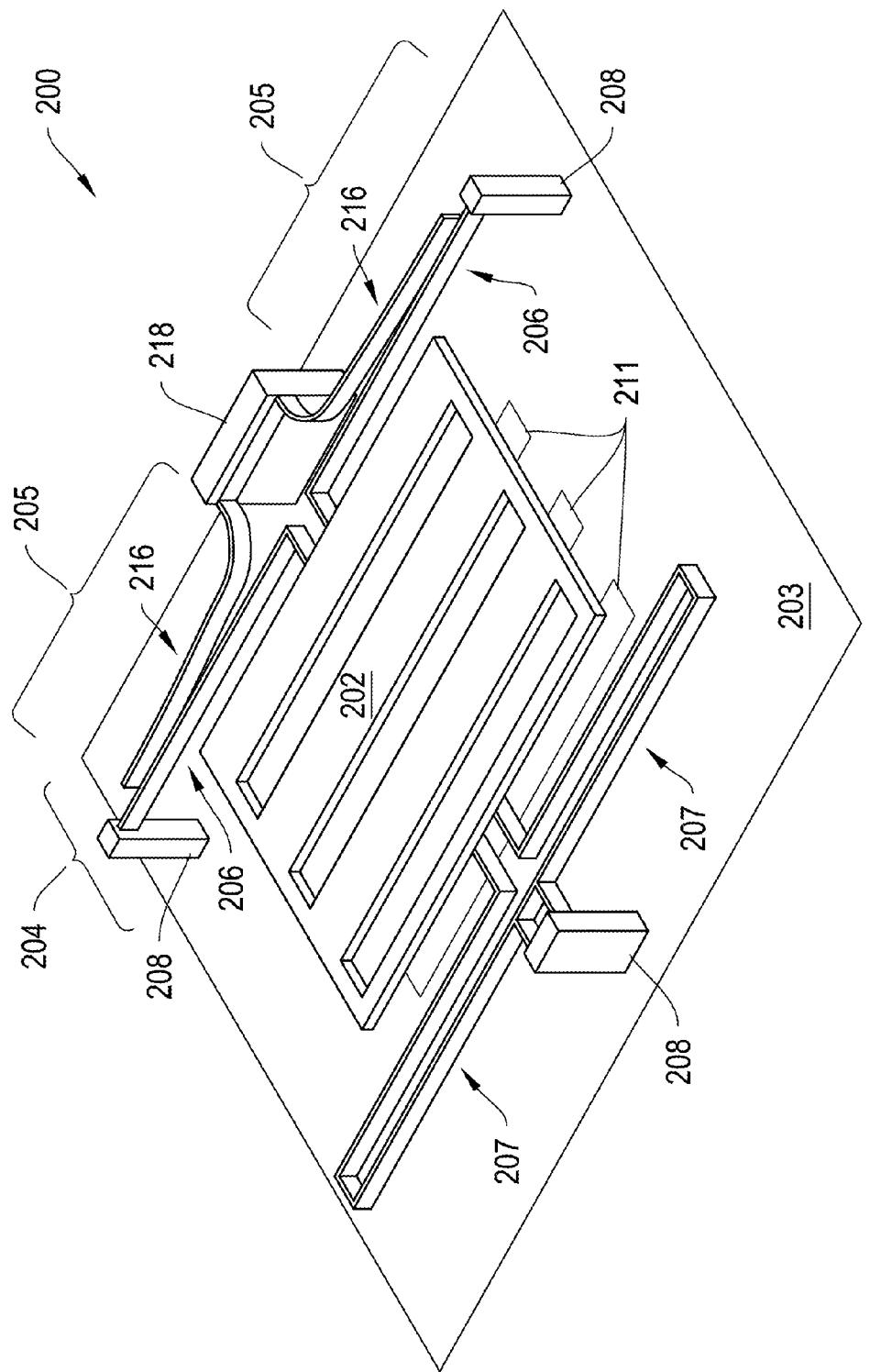
FIG. 2A shows an example perspective view of an illustrative shutter-based light modulator.

FIG. 2A shows a perspective view of an example shutter-based light modulator 200. The shutter-based light modulator 200 is suitable for incorporation into the direct-view MEMS-based display apparatus 100 of FIG. 1A. The light modulator 200 includes a shutter 202 coupled to an actuator 204. The actuator 204 can be formed from two separate compliant electrode beam actuators 205 (the "actuators 205"). The shutter 202 couples on one side to the actuators 205. The actuators 205 move the shutter 202 transversely over a surface 203 in a plane of motion which is substantially parallel to the surface 203. The opposite side of the shutter 202 couples to a spring 207 which provides a restoring force opposing the forces exerted by the actuator 204.

Each actuator 205 includes a compliant load beam 206 connecting the shutter 202 to a load anchor 208. The load anchors 208 along with the compliant load beams 206 serve as mechanical supports, keeping the shutter 202 suspended proximate to the surface 203. The surface 203 includes one or more aperture holes 211 for admitting the passage of light. The load anchors 208 physically connect the compliant load beams 206 and the shutter 202 to the surface 203 and electrically connect the load beams 206 to a bias voltage, in some instances, ground.

If the substrate is opaque, such as silicon, then aperture holes 211 are formed in the substrate by etching an array of holes through the substrate 203. If the substrate is transparent, such as glass or plastic, then the aperture holes 211 are formed in a layer of light-blocking material deposited on the substrate. The aperture holes 211 can be generally circular, elliptical, polygonal, serpentine, or irregular in shape.

Each actuator 205 also includes a compliant drive beam 216 positioned adjacent to each load beam 206. The drive beams 216 couple at one end to a drive beam anchor 218 shared between the drive beams 216. The other end of each drive beam 216 is free to move. Each drive beam 216 is curved such that it is closest to the load beam 206 near the free end of the drive beam 216 and the anchored end of the load beam 206.

In operation, a display apparatus incorporating the light modulator 200 applies an electric potential to the drive beams 216 via the drive beam anchor 218. A second electric potential may be applied to the load beams 206. The resulting potential difference between the drive beams 216 and the load beams 206 pulls the free ends of the drive beams 216 towards the anchored ends of the load beams 206, and pulls the shutter ends of the load beams 206 toward the anchored ends of the drive beams 216, thereby driving the shutter 202 transversely toward the drive anchor 218. The compliant members 206 act as springs, such that when the voltage across the beams 206 and 216 is removed, the load beams 206 push the shutter 202 back into its initial position, releasing the stress stored in the load beams 206.

A light modulator, such as the light modulator 200, incorporates a passive restoring force, such as a spring, for returning a shutter to its rest position after voltages have been removed. Other shutter assemblies can incorporate a dual set of "open" and "closed" actuators and a separate set of "open" and "closed" electrodes for moving the shutter into either an open or a closed state.

There are a variety of methods by which an array of shutters and apertures can be controlled via a control matrix to produce images, in many cases moving images, with appropriate luminance levels. In some cases, control is accomplished by means of a passive matrix array of row and column interconnects connected to driver circuits on the periphery of the display. In other cases it is appropriate to include switching and/or data storage elements within each pixel of the array (the so-called active matrix) to improve the speed, the luminance level and/or the power dissipation performance of the display.

Figure 2B:
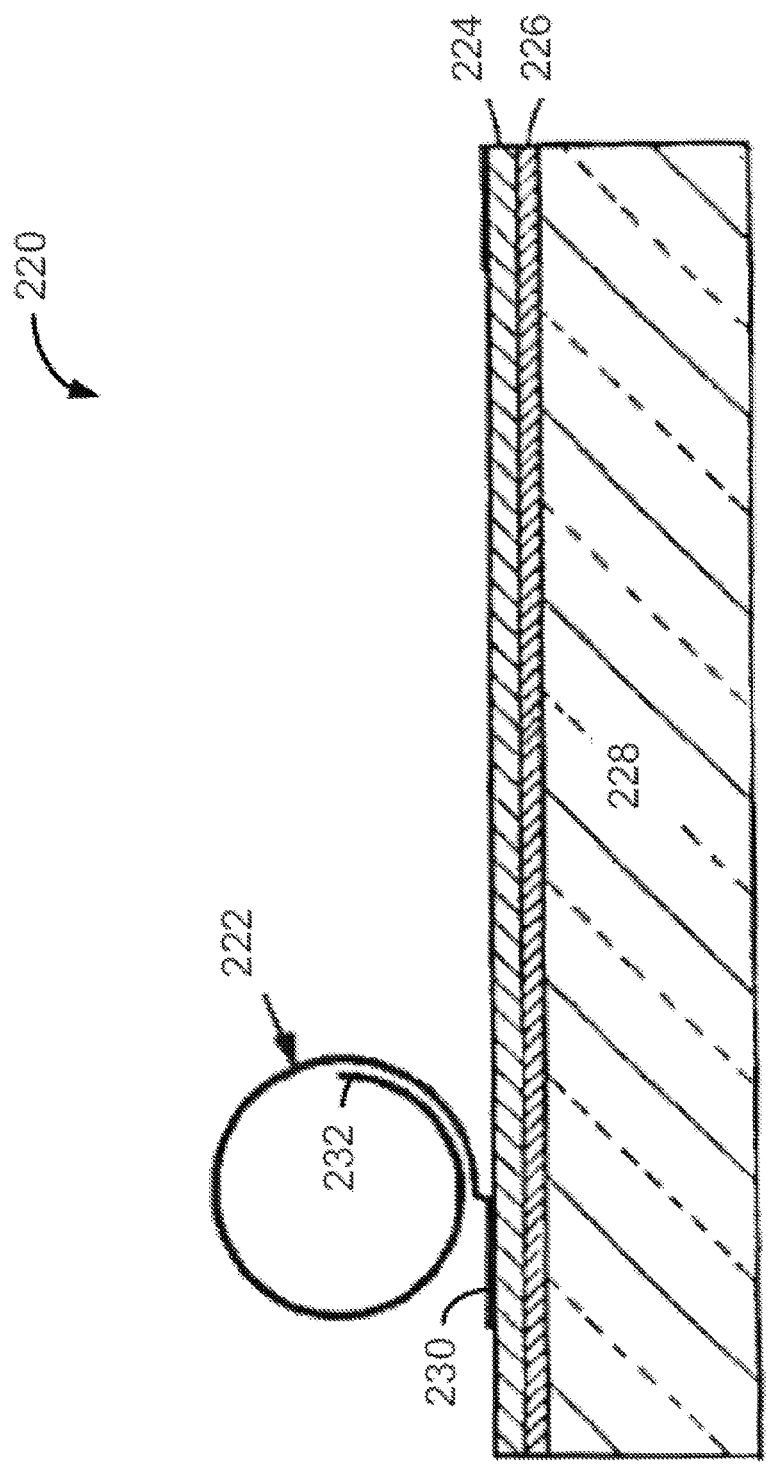
FIG. 2B shows an example cross sectional view of a rolling actuator shutter-based light modulator.

The display apparatus 100, in alternative implementations, includes display elements other than transverse shutter-based light modulators, such as the shutter assembly 200 described above. For example, FIG. 2B shows an example cross sectional view of an example rolling actuator shutter-based light modulator 220. The rolling actuator shutter-based light modulator 220 is suitable for incorporation into an alternative implementation of the MEMS-based display apparatus 100 of FIG. 1A. A rolling actuator-based light modulator includes a movable electrode disposed opposite a fixed electrode and biased to move in a particular direction to function as a shutter upon application of an electric field. In some implementations, the light modulator 220 includes a planar electrode 226 disposed between a substrate 228 and an insulating layer 224 and a movable electrode 222 having a fixed end 230 attached to the insulating layer 224. In the absence of any applied voltage, a movable end 232 of the movable electrode 222 is free to roll towards the fixed end 230 to produce a rolled state. Application of a voltage between the electrodes 222 and 226 causes the movable electrode 222 to unroll and lie flat against the insulating layer 224, whereby it acts as a shutter that blocks light traveling through the substrate 228. The movable electrode 222 returns to the rolled state by means of an elastic restoring force after the voltage is removed. The bias towards a rolled state may be achieved by manufacturing the movable electrode 222 to include an anisotropic stress state.

FIG. 2C shows an example cross sectional view of an illustrative non shutter-based MEMS light modulator 250. The light tap modulator 250 is suitable for incorporation into an alternative implementation of the MEMS-based display apparatus 100 of FIG. 1A. A light tap works according to a principle of frustrated total internal reflection (TIR). That is, light 252 is introduced into a light guide 254, in which, without interference, light 252 is, for the most part, unable to escape the light guide 254 through its front or rear surfaces due to TIR. The light tap 250 includes a tap element 256 that has a sufficiently high index of refraction that, in response to the tap element 256 contacting the light guide 254, the light 252 impinging on the surface of the light guide 254 adjacent the tap element 256 escapes the light guide 254 through the tap element 256 towards a viewer, thereby contributing to the formation of an image.

In some implementations, the tap element 256 is formed as part of a beam 258 of flexible, transparent material. Electrodes 260 coat portions of one side of the beam 258. Opposing electrodes 262 are disposed on the light guide 254. By applying a voltage across the electrodes 260 and 262, the position of the tap element 256 relative to the light guide 254 can be controlled to selectively extract light 252 from the light guide 254.

Figure 2D:
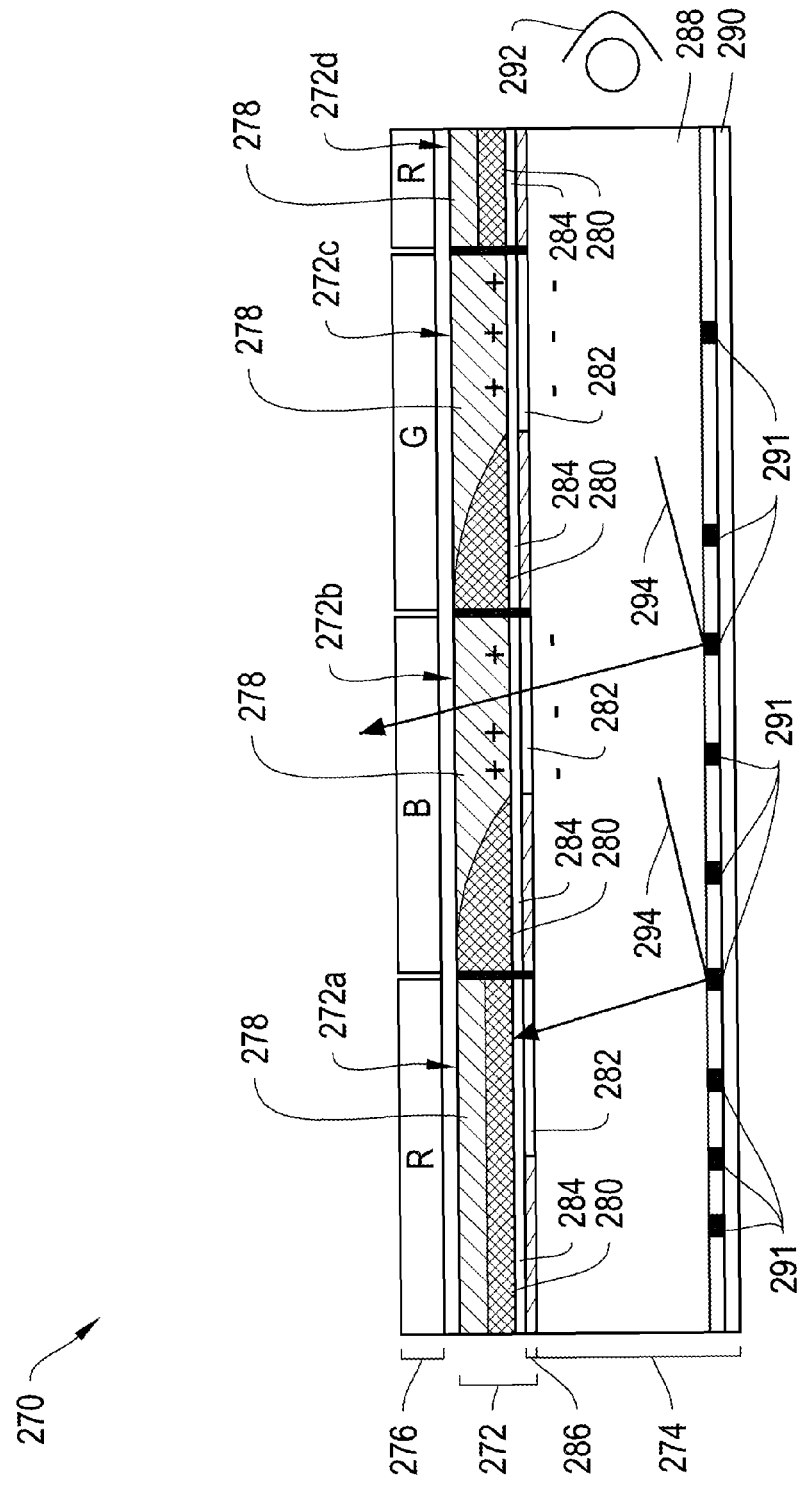
FIG. 2D shows an example cross sectional view of an electrowetting-based light modulation array.

FIG. 2D shows an example cross sectional view of an electrowetting-based light modulation array 270. The electrowetting-based light modulation array 270 is suitable for incorporation into an alternative implementation of the MEMS-based display apparatus 100 of FIG. 1A. The light modulation array 270 includes a plurality of electrowetting-based light modulation cells 272a-d (generally "cells 272") formed on an optical cavity 274. The light modulation array 270 also includes a set of color filters 276 corresponding to the cells 272.

Each cell 272 includes a layer of water (or other transparent conductive or polar fluid) 278, a layer of light absorbing oil 280, a transparent electrode 282 (made, for example, from indium-tin oxide (ITO)) and an insulating layer 284 positioned between the layer of light absorbing oil 280 and the transparent electrode 282. In the implementation described herein, the electrode takes up a portion of a rear surface of a cell 272.

The remainder of the rear surface of a cell 272 is formed from a reflective aperture layer 286 that forms the front surface of the optical cavity 274. The reflective aperture layer 286 is formed from a reflective material, such as a reflective metal or a stack of thin films forming a dielectric mirror. For each cell 272, an aperture is formed in the reflective aperture layer 286 to allow light to pass through. The electrode 282 for the cell is deposited in the aperture and over the material forming the reflective aperture layer 286, separated by another dielectric layer.

The remainder of the optical cavity 274 includes a light guide 288 positioned proximate the reflective aperture layer 286, and a second reflective layer 290 on a side of the light guide 288 opposite the reflective aperture layer 286. A series of light redirectors 291 are formed on the rear surface of the light guide, proximate the second reflective layer. The light redirectors 291 may be either diffuse or specular reflectors. One or more light sources 292, such as LEDs, inject light 294 into the light guide 288.

In an alternative implementation, an additional transparent substrate (not shown) is positioned between the light guide 288 and the light modulation array 270. In this implementation, the reflective aperture layer 286 is formed on the additional transparent substrate instead of on the surface of the light guide 288.

In operation, application of a voltage to the electrode 282 of a cell (for example, cell 272b or 272c) causes the light absorbing oil 280 in the cell to collect in one portion of the cell 272. As a result, the light absorbing oil 280 no longer obstructs the passage of light through the aperture formed in the reflective aperture layer 286 (see, for example, cells 272b and 272c). Light escaping the backlight at the aperture is then able to escape through the cell and through a corresponding color filter (for example, red, green or blue) in the set of color filters 276 to form a color pixel in an image. When the electrode 282 is grounded, the light absorbing oil 280 covers the aperture in the reflective aperture layer 286, absorbing any light 294 attempting to pass through it.

The area under which oil 280 collects when a voltage is applied to the cell 272 constitutes wasted space in relation to forming an image. This area is non-transmissive, whether a voltage is applied or not. Therefore, without the inclusion of the reflective portions of reflective apertures layer 286, this area absorbs light that otherwise could be used to contribute to the formation of an image. However, with the inclusion of the reflective aperture layer 286, this light, which otherwise would have been absorbed, is reflected back into the light guide 288 for future escape through a different aperture. The electrowetting-based light modulation array 270 is not the only example of a non-shutter-based MEMS modulator suitable for inclusion in the display apparatus described herein. Other forms of non-shutter-based MEMS modulators could likewise be controlled by various ones of the controller functions described herein without departing from the scope of this disclosure.

Figure 3A:
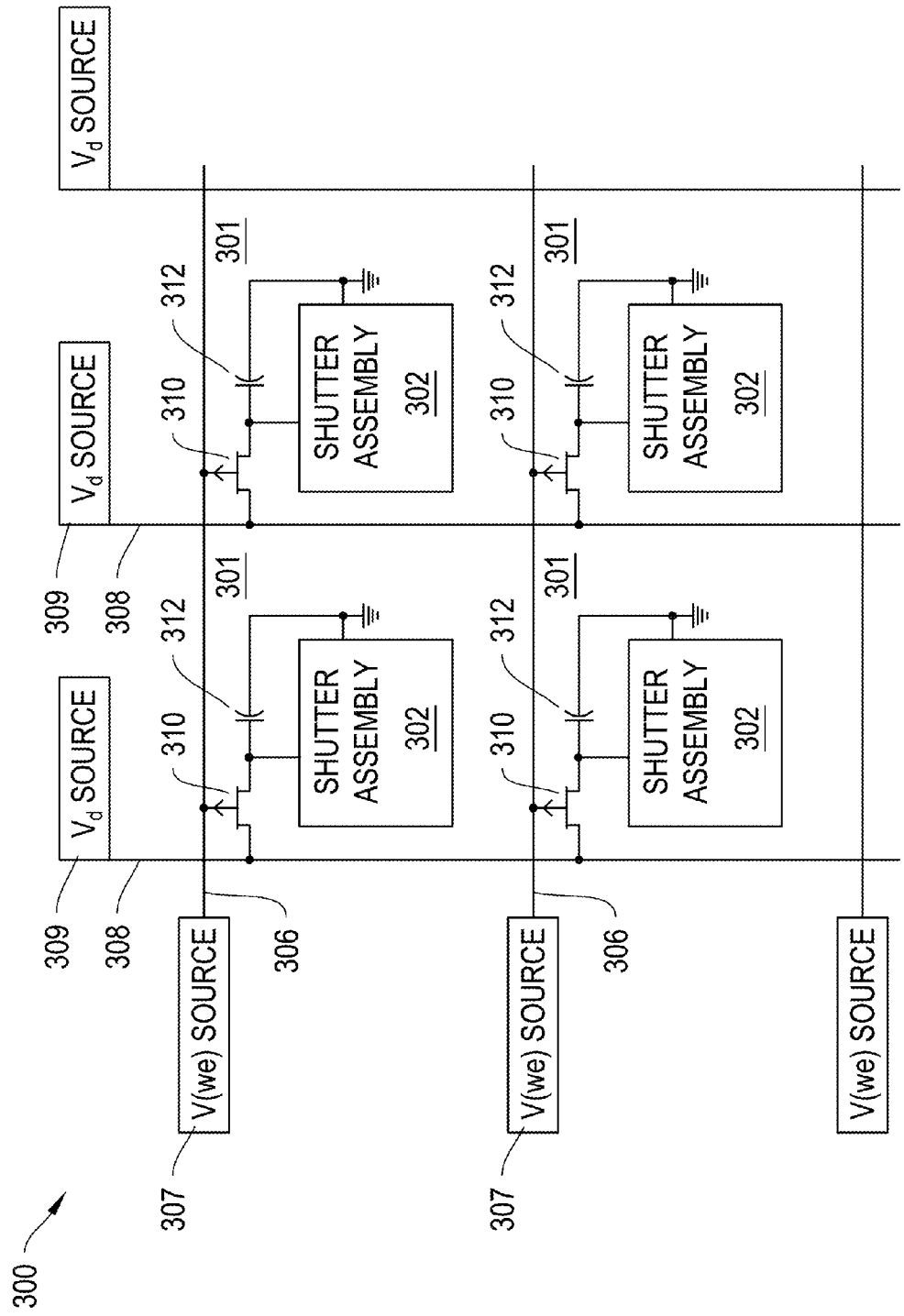
FIG. 3A shows an example schematic diagram of a control matrix.
Figure 3B:
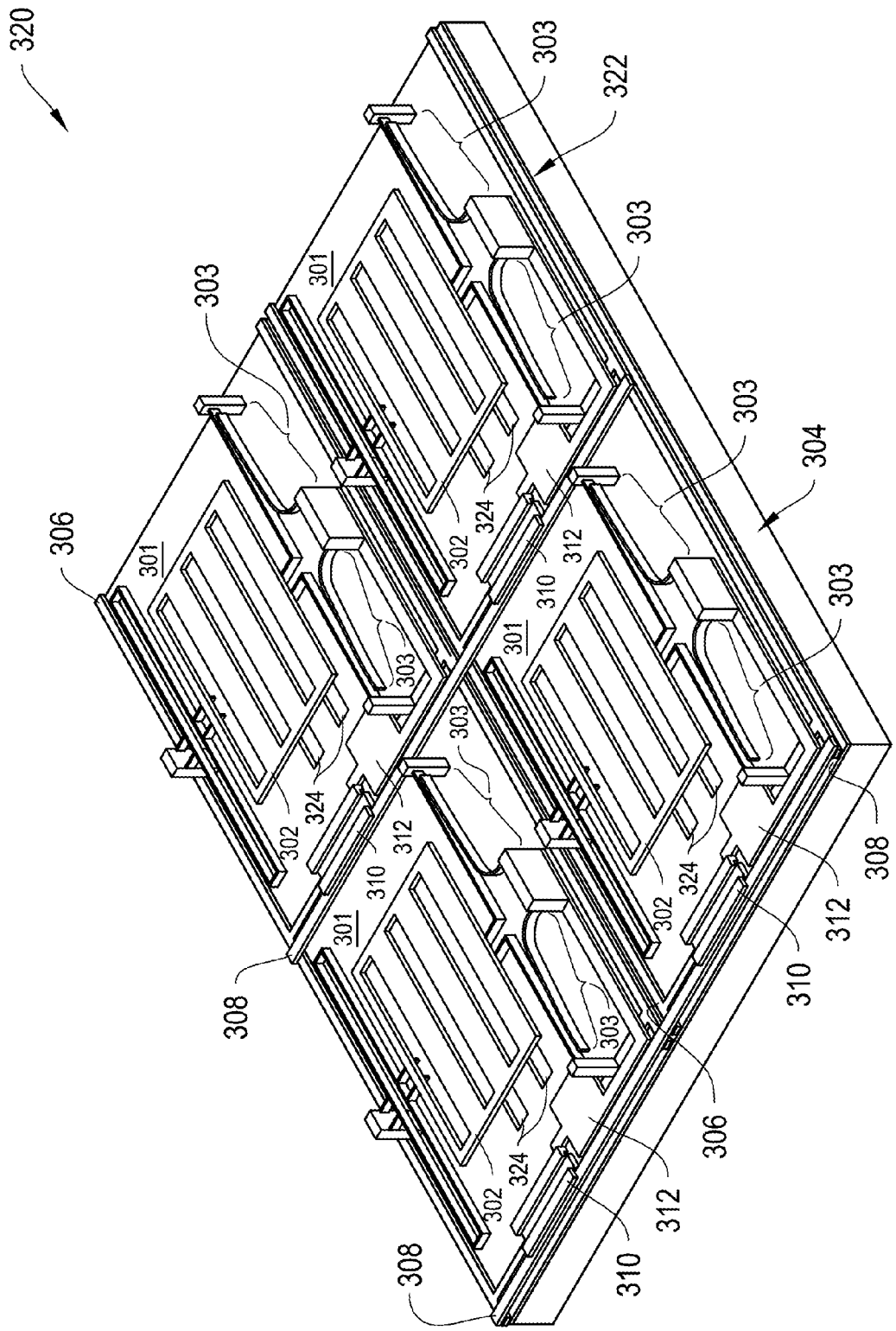
FIG. 3B shows an example perspective view of an array of shutter-based light modulators connected to the control matrix of FIG. 3A.

FIG. 3A shows a schematic diagram of an example control matrix 300. The control matrix 300 is suitable for controlling the light modulators incorporated into the MEMS-based display apparatus 100 of FIG. 1A. FIG. 3B shows an example perspective view of an array 320 of shutter-based light modulators connected to the control matrix 300 of FIG. 3A. The control matrix 300 may address an array of pixels 320 (the "array 320"). Each pixel 301 can include an elastic shutter assembly 302, such as the shutter assembly 200 of FIG. 2A, controlled by an actuator 303. Each pixel also can include an aperture layer 322 that includes apertures 324.

The control matrix 300 is fabricated as a diffused or thin-film-deposited electrical circuit on the surface of a substrate 304 on which the shutter assemblies 302 are formed. The control matrix 300 includes a scan-line interconnect 306 for each row of pixels 301 in the control matrix 300 and a data-interconnect 308 for each column of pixels 301 in the control matrix 300. Each scan-line interconnect 306 electrically connects a write-enabling voltage source 307 to the pixels 301 in a corresponding row of pixels 301. Each data interconnect 308 electrically connects a data voltage source 309 ("$V_d$ source") to the pixels 301 in a corresponding column of pixels. In the control matrix 300, the $V_d$ source 309 provides the majority of the energy to be used for actuation of the shutter assemblies 302. Thus, the data voltage source, $V_d$ source 309, also serves as an actuation voltage source.

Referring to FIGS. 3A and 3B, for each pixel 301 or for each shutter assembly 302 in the array of pixels 320, the control matrix 300 includes a transistor 310 and a capacitor 312. The gate of each transistor 310 is electrically connected to the scan-line interconnect 306 of the row in the array 320 in which the pixel 301 is located. The source of each transistor 310 is electrically connected to its corresponding data interconnect 308. The actuators 303 of each shutter assembly 302 include two electrodes. The drain of each transistor 310 is electrically connected in parallel to one electrode of the corresponding capacitor 312 and to one of the electrodes of the corresponding actuator 303. The other electrode of the capacitor 312 and the other electrode of the actuator 303 in shutter assembly 302 are connected to a common or ground potential. In alternate implementations, the transistors 310 can be replaced with semiconductor diodes and/or metal-insulator-metal sandwich type switching elements.

In operation, to form an image, the control matrix 300 write-enables each row in the array 320 in a sequence by applying $V_{we}$ to each scan-line interconnect 306 in turn. For a write-enabled row, the application of $V_{we}$ to the gates of the transistors 310 of the pixels 301 in the row allows the flow of current through the data interconnects 308 through the transistors 310 to apply a potential to the actuator 303 of the shutter assembly 302. While the row is write-enabled, data voltages $V_d$ are selectively applied to the data interconnects 308. In implementations providing analog gray scale, the data voltage applied to each data interconnect 308 is varied in relation to the desired brightness of the pixel 301 located at the intersection of the write-enabled scan-line interconnect 306 and the data interconnect 308. In implementations providing digital control schemes, the data voltage is selected to be either a relatively low magnitude voltage (i.e., a voltage near ground) or to meet or exceed $V_{at}$ (the actuation threshold voltage). In response to the application of $V_{at}$ to a data interconnect 308, the actuator 303 in the corresponding shutter assembly actuates, opening the shutter in that shutter assembly 302. The voltage applied to the data interconnect 308 remains stored in the capacitor 312 of the pixel 301 even after the control matrix 300 ceases to apply $V_{we}$ to a row. Therefore, the voltage $V_{we}$ does not have to wait and hold on a row for times long enough for the shutter assembly 302 to actuate; such actuation can proceed after the write-enabling voltage has been removed from the row. The capacitors 312 also function as memory elements within the array 320, storing actuation instructions for the illumination of an image frame.

The pixels 301 as well as the control matrix 300 of the array 320 are formed on a substrate 304. The array 320 includes an aperture layer 322, disposed on the substrate 304, which includes a set of apertures 324 for respective pixels 301 in the array 320. The apertures 324 are aligned with the shutter assemblies 302 in each pixel. In some implementations, the substrate 304 is made of a transparent material, such as glass or plastic. In some other implementations, the substrate 304 is made of an opaque material, but in which holes are etched to form the apertures 324.

The shutter assembly 302 together with the actuator 303 can be made bi-stable. That is, the shutters can exist in at least two equilibrium positions (such as open or closed) with little or no power required to hold them in either position. More particularly, the shutter assembly 302 can be mechanically bi-stable. Once the shutter of the shutter assembly 302 is set in position, no electrical energy or holding voltage is required to maintain that position. The mechanical stresses on the physical elements of the shutter assembly 302 can hold the shutter in place.

The shutter assembly 302 together with the actuator 303 also can be made electrically bi-stable. In an electrically bi-stable shutter assembly, there exists a range of voltages below the actuation voltage of the shutter assembly, which if applied to a closed actuator (with the shutter being either open or closed), holds the actuator closed and the shutter in position, even if an opposing force is exerted on the shutter. The opposing force may be exerted by a spring such as the spring 207 in the shutter-based light modulator 200 depicted in FIG. 2A, or the opposing force may be exerted by an opposing actuator, such as an "open" or "closed" actuator.

The light modulator array 320 is depicted as having a single MEMS light modulator per pixel. Other implementations are possible in which multiple MEMS light modulators are provided in each pixel, thereby providing the possibility of more than just binary "on' or "off" optical states in each pixel. Certain forms of coded area division gray scale are possible where multiple MEMS light modulators in the pixel are provided, and where apertures 324, which are associated with each of the light modulators, have unequal areas.

In some other implementations, the roller-based light modulator 220, the light tap 250, or the electrowetting-based light modulation array 270, as well as other MEMS-based light modulators, can be substituted for the shutter assembly 302 within the light modulator array 320.

Figures 4A, 4B:
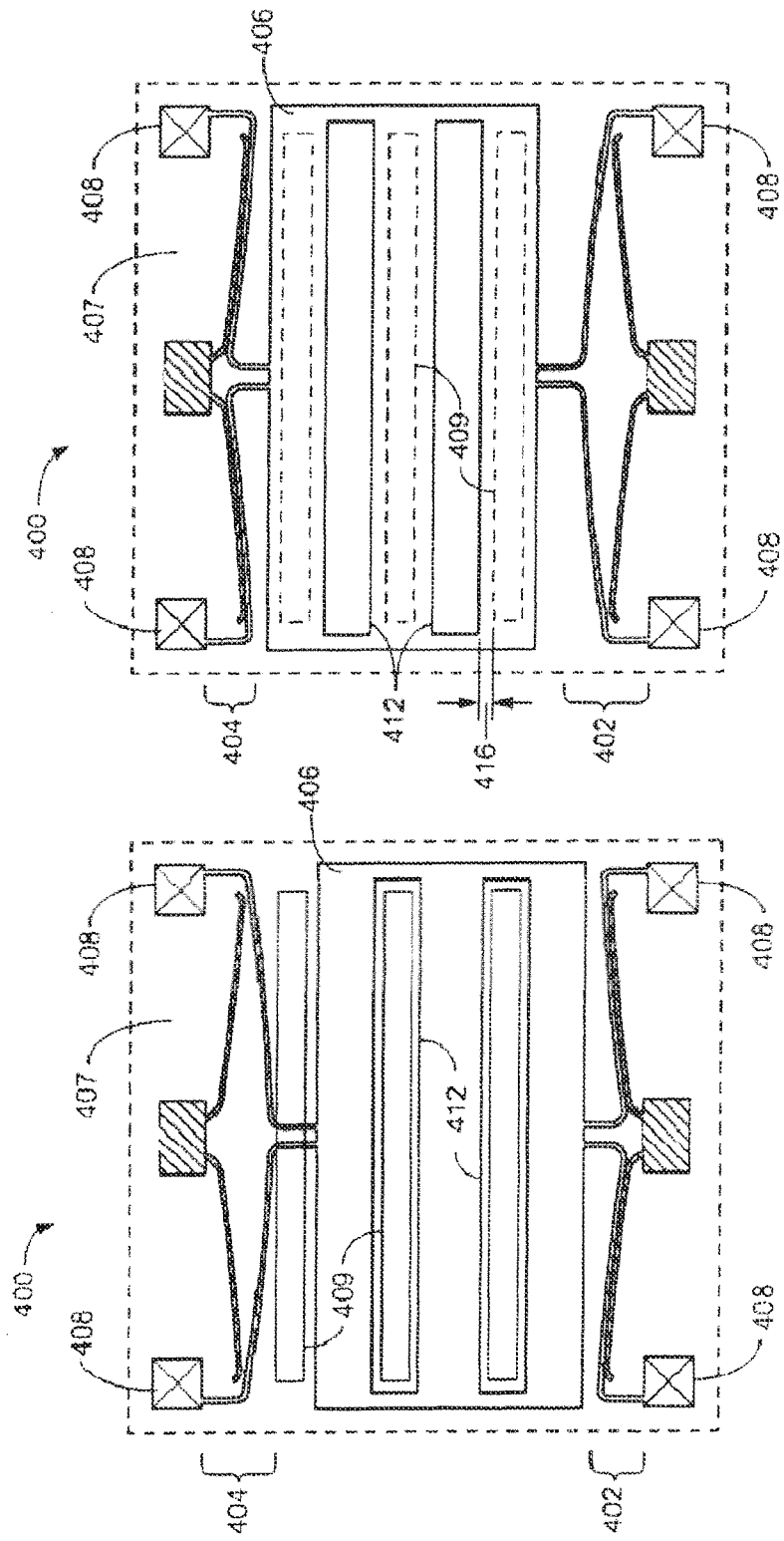
FIGS. 4A and 4B show example views of a dual actuator shutter assembly.

FIGS. 4A and 4B show views of an example dual actuator shutter assembly 400. The dual actuator shutter assembly 400, as depicted in FIG. 4A, is in an open state. FIG. 4B shows the dual actuator shutter assembly 400 in a closed state. In contrast to the shutter assembly 200, the shutter assembly 400 includes actuators 402 and 404 on either side of a shutter 406. Each actuator 402 and 404 is independently controlled. A first actuator, a shutter-open actuator 402, serves to open the shutter 406. A second opposing actuator, the shutter-close actuator 404, serves to close the shutter 406. Both of the actuators 402 and 404 are compliant beam electrode actuators. The actuators 402 and 404 open and close the shutter 406 by driving the shutter 406 substantially in a plane parallel to an aperture layer 407 over which the shutter is suspended. The shutter 406 is suspended a short distance over the aperture layer 407 by anchors 408 attached to the actuators 402 and 404. The inclusion of supports attached to both ends of the shutter 406 along its axis of movement reduces out of plane motion of the shutter 406 and confines the motion substantially to a plane parallel to the substrate. By analogy to the control matrix 300 of FIG. 3A, a control matrix suitable for use with the shutter assembly 400 might include one transistor and one capacitor for each of the opposing shutter-open and shutter-close actuators 402 and 404.

The shutter 406 includes two shutter apertures 412 through which light can pass. The aperture layer 407 includes a set of three apertures 409. In FIG. 4A, the shutter assembly 400 is in the open state and, as such, the shutter-open actuator 402 has been actuated, the shutter-close actuator 404 is in its relaxed position, and the centerlines of the shutter apertures 412 coincide with the centerlines of two of the aperture layer apertures 409. In FIG. 4B the shutter assembly 400 has been moved to the closed state and, as such, the shutter-open actuator 402 is in its relaxed position, the shutter-close actuator 404 has been actuated, and the light blocking portions of the shutter 406 are now in position to block transmission of light through the apertures 409 (depicted as dotted lines).

Each aperture has at least one edge around its periphery. For example, the rectangular apertures 409 have four edges. In alternative implementations in which circular, elliptical, oval, or other curved apertures are formed in the aperture layer 407, each aperture may have only a single edge. In some other implementations, the apertures need not be separated or disjoint in the mathematical sense, but instead can be connected. That is to say, while portions or shaped sections of the aperture may maintain a correspondence to each shutter, several of these sections may be connected such that a single continuous perimeter of the aperture is shared by multiple shutters.

In order to allow light with a variety of exit angles to pass through apertures 412 and 409 in the open state, it is advantageous to provide a width or size for shutter apertures 412 which is larger than a corresponding width or size of apertures 409 in the aperture layer 407. In order to effectively block light from escaping in the closed state, it is preferable that the light blocking portions of the shutter 406 overlap the apertures 409. FIG. 4B shows a predefined overlap 416 between the edge of light blocking portions in the shutter 406 and one edge of the aperture 409 formed in the aperture layer 407.

The electrostatic actuators 402 and 404 are designed so that their voltage-displacement behavior provides a bi-stable characteristic to the shutter assembly 400. For each of the shutter-open and shutter-close actuators there exists a range of voltages below the actuation voltage, which if applied while that actuator is in the closed state (with the shutter being either open or closed), will hold the actuator closed and the shutter in position, even after an actuation voltage is applied to the opposing actuator. The minimum voltage needed to maintain a shutter's position against such an opposing force is referred to as a maintenance voltage $V_m$.

Figure 5:
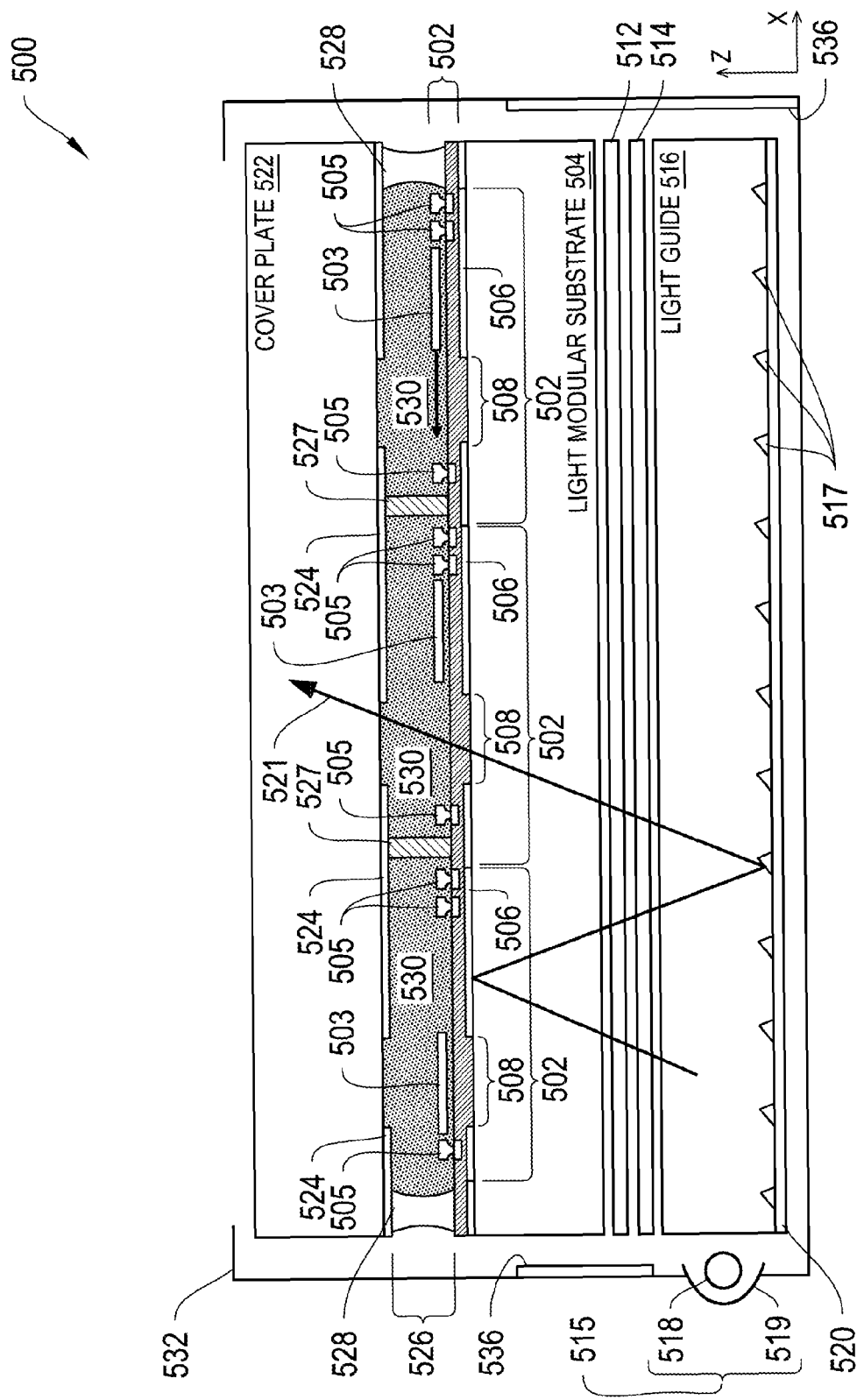
FIG. 5 shows an example cross sectional view of a display apparatus incorporating shutter-based light modulators.

FIG. 5 shows a cross sectional view of an example display apparatus 500 incorporating shutter-based light modulators (shutter assemblies) 502. Each shutter assembly 502 incorporates a shutter 503 and an anchor 505. Not shown are the compliant beam actuators which, when connected between the anchors 505 and the shutters 503, help to suspend the shutters 503 a short distance above the surface. The shutter assemblies 502 are disposed on a transparent substrate 504, such a substrate made of plastic or glass. A rear-facing reflective layer, reflective film 506, disposed on the substrate 504 defines a plurality of surface apertures 508 located beneath the closed positions of the shutters 503 of the shutter assemblies 502. The reflective film 506 reflects light not passing through the surface apertures 508 back towards the rear of the display apparatus 500. The reflective aperture layer 506 can be a fine-grained metal film without inclusions formed in thin film fashion by a number of vapor deposition techniques including sputtering, evaporation, ion plating, laser ablation, or chemical vapor deposition (CVD). In some other implementations, the rear-facing reflective layer 506 can be formed from a mirror, such as a dielectric mirror. A dielectric mirror can be fabricated as a stack of dielectric thin films which alternate between materials of high and low refractive index. The vertical gap which separates the shutters 503 from the reflective film 506, within which the shutter is free to move, is in the range of 0.5 to 10 microns. The magnitude of the vertical gap is preferably less than the lateral overlap between the edge of shutters 503 and the edge of apertures 508 in the closed state, such as the overlap 416 depicted in FIG. 4B.

The display apparatus 500 includes an optional diffuser 512 and/or an optional brightness enhancing film 514 which separate the substrate 504 from a planar light guide 516. The light guide 516 includes a transparent, i.e., glass or plastic material. The light guide 516 is illuminated by one or more light sources 518, forming a backlight 515. The light sources 518 can be, for example, and without limitation, incandescent lamps, fluorescent lamps, lasers or light emitting diodes (LEDs). A reflector 519 helps direct light from lamp 518 towards the light guide 516. A front-facing reflective film 520 is disposed behind the backlight 515, reflecting light towards the shutter assemblies 502. Light rays such as ray 521 from the backlight 515 that do not pass through one of the shutter assemblies 502 will be returned to the backlight 515 and reflected again from the film 520. In this fashion light that fails to leave the display apparatus 500 to form an image on the first pass can be recycled and made available for transmission through other open apertures in the array of shutter assemblies 502. Such light recycling has been shown to increase the illumination efficiency of the display.

The light guide 516 includes a set of geometric light redirectors or prisms 517 which re-direct light from the lamps 518 towards the apertures 508 and hence toward the front of the display. The light redirectors 517 can be molded into the plastic body of light guide 516 with shapes that can be alternately triangular, trapezoidal, or curved in cross section. The density of the prisms 517 generally increases with distance from the lamp 518.

In some implementations, the aperture layer 506 can be made of a light absorbing material, and in alternate implementations the surfaces of shutter 503 can be coated with either a light absorbing or a light reflecting material. In some other implementations, the aperture layer 506 can be deposited directly on the surface of the light guide 516. In some implementations, the aperture layer 506 need not be disposed on the same substrate as the shutters 503 and anchors 505 (such as in the MEMS-down configuration described below).

In some implementations, the light sources 518 can include lamps of different colors, for instance, the colors red, green and blue. A color image can be formed by sequentially illuminating images with lamps of different colors at a rate sufficient for the human brain to average the different colored images into a single multi-color image. The various color-specific images are formed using the array of shutter assemblies 502. In another implementation, the light source 518 includes lamps having more than three different colors. For example, the light source 518 may have red, green, blue and white lamps, or red, green, blue and yellow lamps. In some other implementations, the light source 518 may include cyan, magenta, yellow and white lamps, red, green, blue and white lamps. In some other implementations, additional lamps may be included in the light source 518. For example, if using five colors, the light source 518 may include red, green, blue, cyan and yellow lamps. In some other implementations, the light source 518 may include white, orange, blue, purple and green lamps or white, blue, yellow, red and cyan lamps. If using six colors, the light source 518 may include red, green, blue, cyan, magenta and yellow lamps or white, cyan, magenta, yellow, orange and green lamps.

A cover plate 522 forms the front of the display apparatus 500. The rear side of the cover plate 522 can be covered with a black matrix 524 to increase contrast. In alternate implementations the cover plate includes color filters, for instance distinct red, green, and blue filters corresponding to different ones of the shutter assemblies 502. The cover plate 522 is supported a predetermined distance away from the shutter assemblies 502 forming a gap 526. The gap 526 is maintained by mechanical supports or spacers 527 and/or by an adhesive seal 528 attaching the cover plate 522 to the substrate 504.

The adhesive seal 528 seals in a fluid 530. The fluid 530 is engineered with viscosities preferably below about 10 centipoise and with relative dielectric constant preferably above about 2.0, and dielectric breakdown strengths above about $10^4$ V/cm. The fluid 530 also can serve as a lubricant. In some implementations, the fluid 530 is a hydrophobic liquid with a high surface wetting capability. In alternate implementations, the fluid 530 has a refractive index that is either greater than or less than that of the substrate 504.

Displays that incorporate mechanical light modulators can include hundreds, thousands, or in some cases, millions of moving elements. In some devices, every movement of an element provides an opportunity for static friction to disable one or more of the elements. This movement is facilitated by immersing all the parts in a fluid (also referred to as fluid 530)

and sealing the fluid (such as with an adhesive) within a fluid space or gap in a MEMS display cell. The fluid 530 is usually one with a low coefficient of friction, low viscosity, and minimal degradation effects over the long term. When the MEMS-based display assembly includes a liquid for the fluid 530, the liquid at least partially surrounds some of the moving parts of the MEMS-based light modulator. In some implementations, in order to reduce the actuation voltages, the liquid has a viscosity below 70 centipoise. In some other implementations, the liquid has a viscosity below 10 centipoise. Liquids with viscosities below 70 centipoise can include materials with low molecular weights: below 4000 grams/mole, or in some cases below 400 grams/mole. Fluids 530 that also may be suitable for such implementations include, without limitation, de-ionized water, methanol, ethanol and other alcohols, paraffins, olefins, ethers, silicone oils, fluorinated silicone oils, or other natural or synthetic solvents or lubricants. Useful fluids can be polydimethylsiloxanes (PDMS), such as hexamethyldisiloxane and octamethyltrisiloxane, or alkyl methyl siloxanes such as hexylpentamethyldisiloxane. Useful fluids can be alkanes, such as octane or decane. Useful fluids can be nitroalkanes, such as nitromethane. Useful fluids can be aromatic compounds, such as toluene or diethylbenzene. Useful fluids can be ketones, such as butanone or methyl isobutyl ketone. Useful fluids can be chlorocarbons, such as chlorobenzene. Useful fluids can be chlorofluorocarbons, such as dichlorofluoroethane or chlorotrifluoroethylene. Other fluids considered for these display assemblies include butyl acetate and dimethylformamide. Still other useful fluids for these displays include hydro fluoro ethers, perfluoropolyethers, hydro fluoro poly ethers, pentanol, and butanol. Example suitable hydro fluoro ethers include ethyl nonafluorobutyl ether and 2-trifluoromethyl-3-ethoxydodecafluorohexane.

A sheet metal or molded plastic assembly bracket 532 holds the cover plate 522, the substrate 504, the backlight 515 and the other component parts together around the edges. The assembly bracket 532 is fastened with screws or indent tabs to add rigidity to the combined display apparatus 500. In some implementations, the light source 518 is molded in place by an epoxy potting compound. Reflectors 536 help return light escaping from the edges of the light guide 516 back into the light guide 516. Not depicted in FIG. 5 are electrical interconnects which provide control signals as well as power to the shutter assemblies 502 and the lamps 518.

In some other implementations, the roller-based light modulator 220, the light tap 250, or the electrowetting-based light modulation array 270, as depicted in FIGS. 2A-2D, as well as other MEMS-based light modulators, can be substituted for the shutter assemblies 502 within the display apparatus 500.

The display apparatus 500 is referred to as the MEMS-up configuration, wherein the MEMS based light modulators are formed on a front surface of the substrate 504, i.e., the surface that faces toward the viewer. The shutter assemblies 502 are built directly on top of the reflective aperture layer 506. In an alternate implementation, referred to as the MEMS-down configuration, the shutter assemblies are disposed on a substrate separate from the substrate on which the reflective aperture layer is formed. The substrate on which the reflective aperture layer is formed, defining a plurality of apertures, is referred to herein as the aperture plate. In the MEMS-down configuration, the substrate that carries the MEMS-based light modulators takes the place of the cover plate 522 in the display apparatus 500 and is oriented such that the MEMS-based light modulators are positioned on the rear surface of the top substrate, i.e., the surface that faces away from the viewer and toward the light guide 516. The MEMS-based light modulators are thereby positioned directly opposite to and across a gap from the reflective aperture layer 506. The gap can be maintained by a series of spacer posts connecting the aperture plate and the substrate on which the MEMS modulators are formed. In some implementations, the spacers are disposed within or between each pixel in the array. The gap or distance that separates the MEMS light modulators from their corresponding apertures is preferably less than 10 microns, or a distance that is less than the overlap between shutters and apertures, such as overlap 416.

Figure 6:
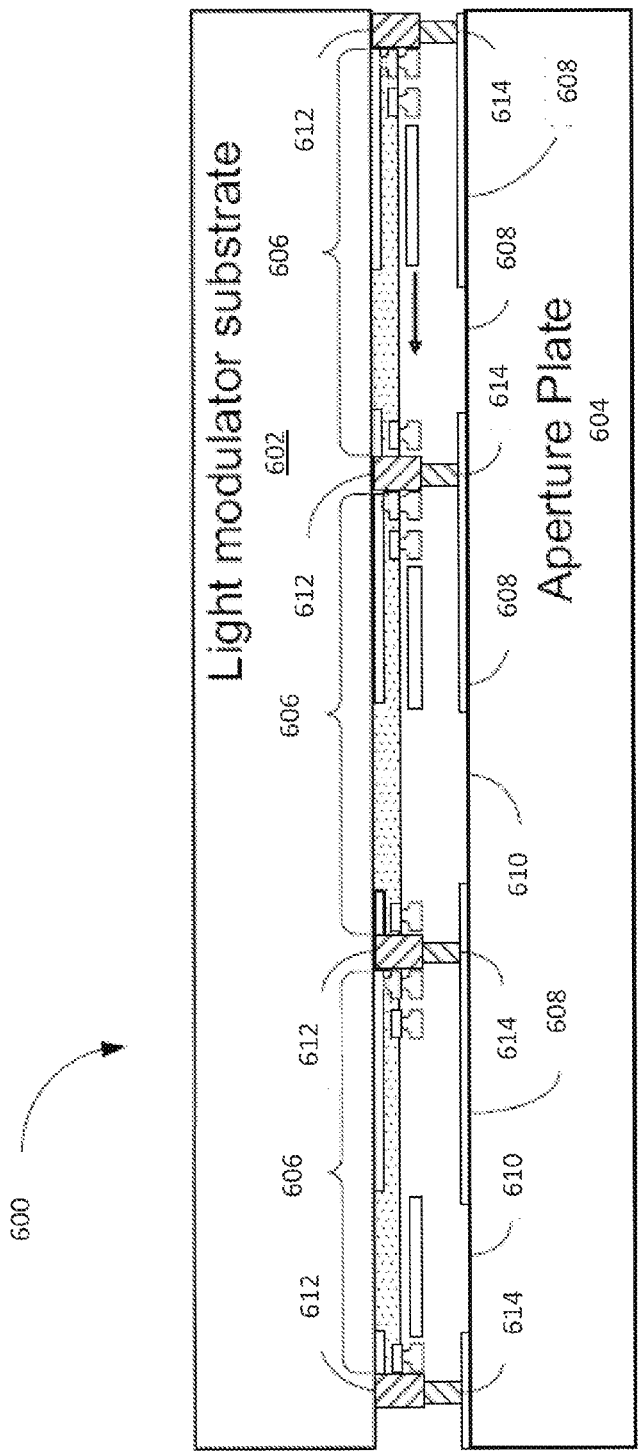
FIG. 6 shows a cross sectional view of an example light modulator substrate and an example aperture plate for use in a MEMS-down configuration of a display.

FIG. 6 shows a cross sectional view of an example light modulator substrate and an example aperture plate for use in a MEMS-down configuration of a display. The display assembly 600 includes a modulator substrate 602 and an aperture plate 604. The display assembly 600 also includes a set of shutter assemblies 606 and a reflective aperture layer 608. The reflective aperture layer 608 includes apertures 610. A predetermined gap or separation between the modulator substrates 602 and the aperture plate 604 is maintained by the opposing set of spacers 612 and 614. The spacers 612 are formed on or as part of the modulator substrate 602. The spacers 614 are formed on or as part of the aperture plate 604. During assembly, the two substrates 602 and 604 are aligned so that spacers 612 on the modulator substrate 602 make contact with their respective spacers 614.

The separation or distance of this illustrative example is 8 microns. To establish this separation, the spacers 612 are 2 microns tall and the spacers 614 are 6 microns tall. Alternately, both spacers 612 and 614 can be 4 microns tall, or the spacers 612 can be 6 microns tall while the spacers 614 are 2 microns tall. In fact, any combination of spacer heights can be employed as long as their total height establishes the desired separation H12.

Providing spacers on both of the substrates 602 and 604, which are then aligned or mated during assembly, has advantages with respect to materials and processing costs. The provision of a very tall, such as larger than 8 micron spacers, can be costly as it can require relatively long times for the cure, exposure, and development of a photo-imageable polymer. The use of mating spacers as in display assembly 600 allows for the use of thinner coatings of the polymer on each of the substrates.

In another implementation, the spacers 612 which are formed on the modulator substrate 602 can be formed from the same materials and patterning blocks that were used to form the shutter assemblies 606. For instance, the anchors employed for shutter assemblies 606 also can perform a function similar to spacer 612. In this implementation, a separate application of a polymer material to form a spacer would not be required and a separate exposure mask for the spacers would not be required.

Figure 7:
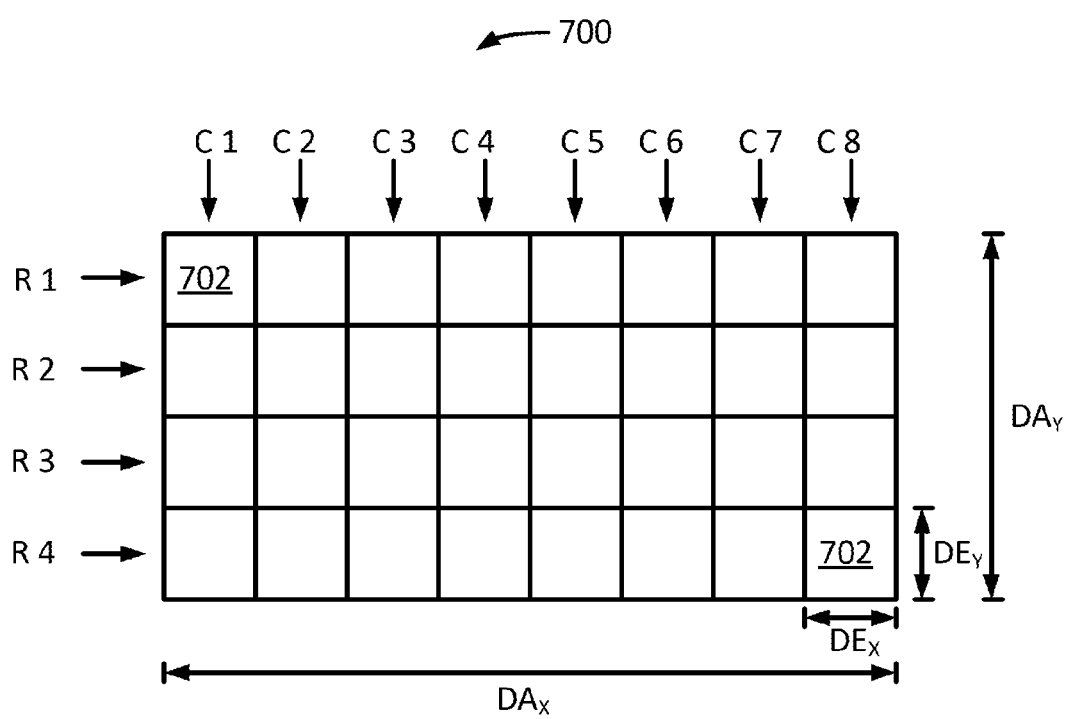
FIG. 7 shows an arrangement of display elements of an example display apparatus.
Figure 8:
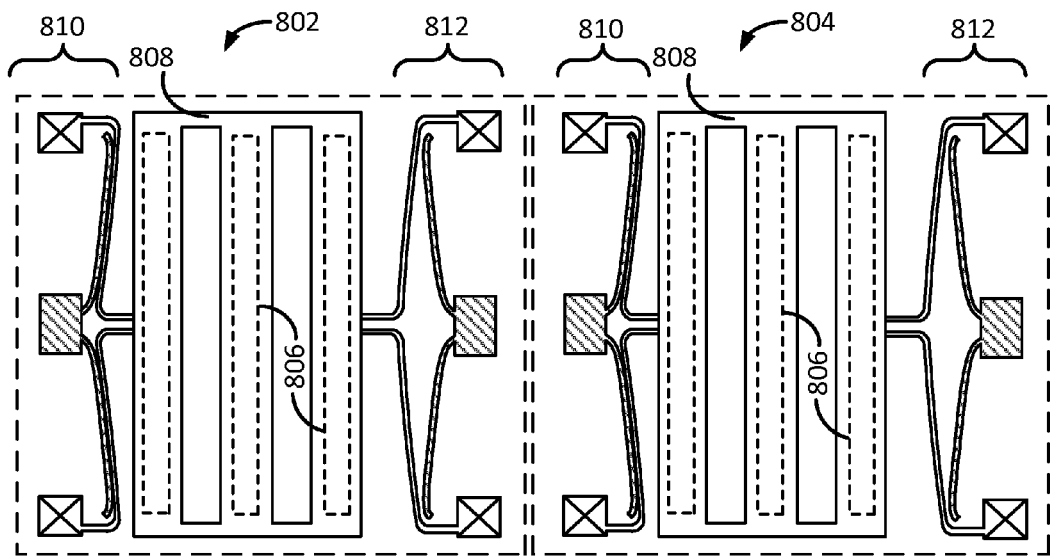
FIG. 8 shows a top view of two example adjacent display elements of a display apparatus.

In the following discussion, FIG. 7 and FIG. 8 are used to describe the configuration of display apparatus having an array of display elements. Subsequently, the discussion in relation to FIGS. 9-13, presents various configurations of display elements within a display apparatus for providing high aperture ratios.

FIG. 7 shows an arrangement of display elements 702 of an example display apparatus 700. The display elements 702 are arranged in an array of rows R1-R4 and columns C1-C8. Each display element 702 encompasses components such as apertures, actuators, shutters, anchors, and control circuitry. For example, the array of display elements 702 shown in FIG. 7 can be similar to the array of shutter assemblies 302 discussed above in relation to FIG. 3B. Furthermore, each display element 702 can include shutter assemblies, such as the shutter assemblies shown in FIGS. 2A, 4A and 4B.

Each display element 702 occupies some area within the display apparatus 700. However, in reality, due to complex interconnect routing schemes and/or potentially shared display element features, it may be difficult to delineate the specific area allocated to a particular display element 702. Therefore, in some implementations, the average dimensions of each display element 702 are determined, as shown in FIG. 7. For example, the average length, $DE_X$, of the display elements 702 in a first dimension is determined by dividing the total length, $DA_X$, of the display apparatus 700 along the first dimension by the total number of display elements 702 (in this case 8) along the first dimension. Similarly, the average length, $DE_Y$, of the display elements 702 in a second dimension is determined by dividing the length, $DA_Y$, of the display apparatus 700 along the second dimension by the total number of display elements 702 (in this case 4) along the second dimension. Typically, the average length of the display elements 702 along the first dimension ($DE_X$) is substantially the same as the average length along the second dimension ($DE_Y$). In other words, the display elements 702 are substantially square shaped. Furthermore, the substantially square shaped display elements 702 are arranged in a grid such that their boundaries are aligned along both the rows and the columns of the array.

In some implementations, each of the display elements 702 is connected to a controller. The controller can be similar to the controller 134 discussed above in relation to FIG. 1B. The controller receives image data, and provides data signals for each display element 702 to actuate the actuators according to the received image data. The image data typically includes values for pixels that represent an image frame. For example, for an image frame having a size of 4×8 pixels, the image data can include pixel values for each of the 32 pixels of the image frame. The controller processes the image pixel values and produces corresponding data signals for each of the display elements 702 of the display apparatus 700. Again using the 4×8-pixel image frame as an example, the controller generates data signals for the display element in row R1 and column C1 based on the value of the image pixel on the top left corner of the image frame. In a similar manner, the controller generates data signals for other display elements based on their position and the value of the image pixel in the corresponding position in the image frame.

Thus, the controller generates data signals for each display element 702 such that the data signal is a function of the same number of image pixels in the first dimension and in the second dimension. For example, the data signal for the display element 702 in row R1 and column C1 is a function of one image pixel in the first dimension and one image pixel in the second dimension. If the image frame is of a lower resolution than the resolution of the display apparatus 700, then the controller can use one image pixel in the first dimension to generate data signals for more than one display element 702 in the first dimension and an equal number of display elements 702 in the second dimension. Conversely, if the image frame is of a higher resolution than the resolution of the display apparatus 700, then the controller can be implemented to generate data signals for each display element 702 using more than one image pixel in the first dimension and an equal number of image pixels in the second dimension.

In one approach, the controller may provide the data signals one row at a time. In this approach, the controller may first enable the display elements 702 in columns C1 through C8 in row R1 to accept data signals. Once the data signals are provided to all the display elements in row R1, the controller can then provide data signals to the display elements 702 in row R2, and so on, until data signals have been provided for the display elements 702 in all rows.

FIG. 8 shows a top view of two example adjacent display elements of a display apparatus. In particular, as an example, FIG. 8 shows a first display element 802 and an adjacent second display element 804 including dual actuator shutter assemblies similar to the ones shown in FIG. 4A. The two adjacent display elements 802 and 804 may represent any two adjacent display elements 702 in any row of the display apparatus 700 shown in FIG. 7.

Each display element 802 and 804 includes three slot apertures 806, a two slot shutter 808 and two actuators 810 and 812. Some portion of the display elements 802 and 804 is occupied by the apertures 806, while a remaining portion is occupied by the actuators 810 and 812, and the shutters 808. A substantial portion of the total area of each display element 802 and 804 is allocated to actuators 810 and 812. This limits the amount of area that can be allocated to the apertures 806. Limiting the area allocated to the apertures, in turn, limits the aperture ratio, and therefore, the light output of each display element 802 and 804. Additional components such as circuitry required to drive the actuators and interconnects to supply data and control signals to the display elements 802 and 804 further limit the aperture ratio of the apertures 806. Furthermore, display devices, in general, are being designed with ever increasing display element density. This increase in display element density, and the increased area dedicated to additional corresponding circuitry and interconnects, further limits the aperture ratio of the apertures 806.

As discussed below in relation to FIGS. 9-13, in some implementations, a display apparatus can incorporate display elements that are configured in a manner that improves the aperture ratio of the display elements while substantially maintaining a perceived display element density.

Figure 9:
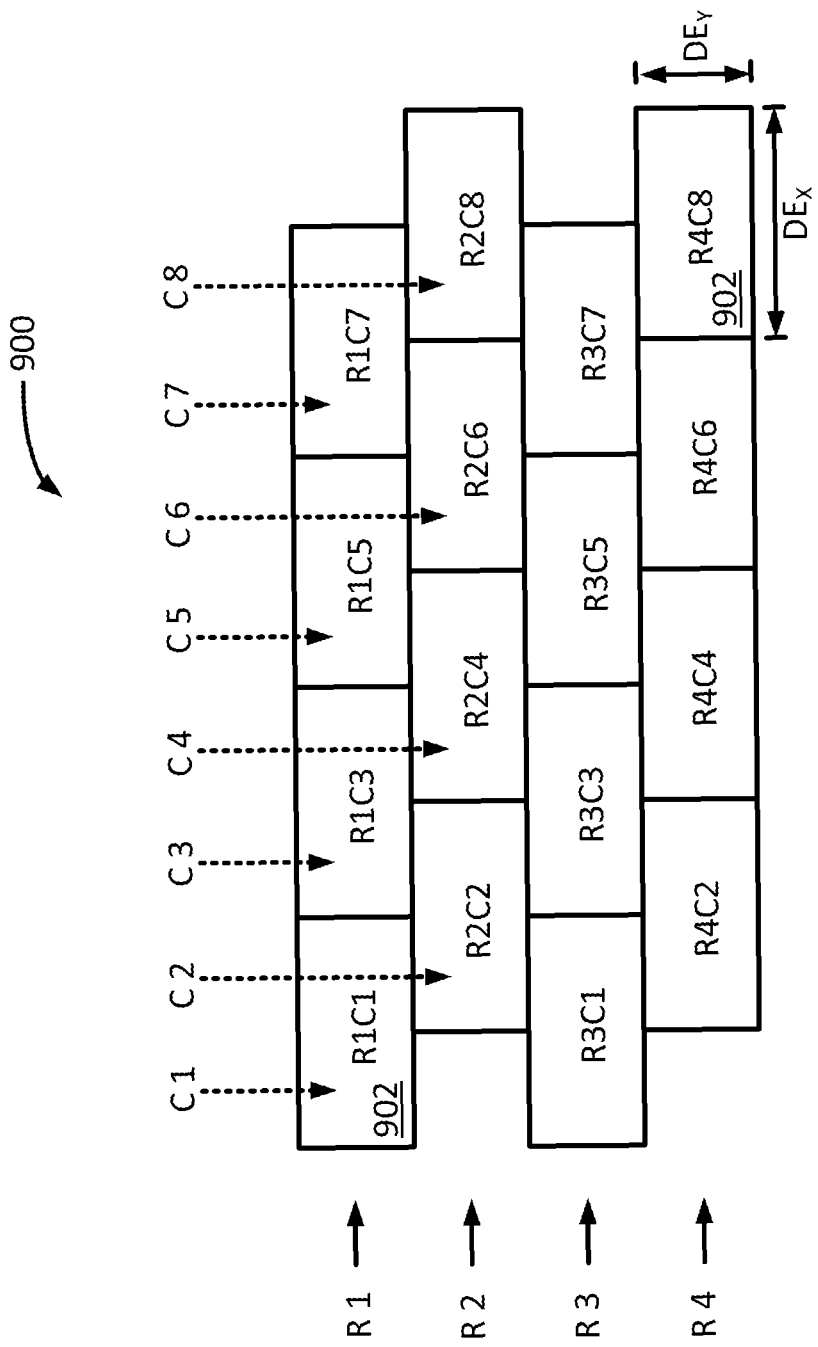
FIG. 9 shows an arrangement of example display elements of another display apparatus.

FIG. 9 shows an arrangement of example display elements 902 of another display apparatus 900. In particular, the display apparatus 900 includes display elements 902 that are arranged in a staggered manner. Furthermore, as discussed in detail below, in some implementations, the average length ($DE_X$) of the each display element 902 in the first dimension is greater than the average length ($DE_Y$) of the display element 902 in the second dimension. In some implementations, $DE_X$ is twice $DE_Y$.

The display elements 902 are arranged in four rows R1-R4 and eight columns C1-C8. Furthermore, the display elements 902 in adjacent rows are staggered or offset. For example, the display elements 902 in row R1 are staggered or offset with respect to display elements 902 of the adjacent row R2. Each column includes display elements from every other row. For example, column C1 includes display elements R1C1 and R3C1 of rows R1 and R3, respectively. Similarly, column C2 includes display elements R2C2 and R4C2 from rows R2 and R4, respectively. A person of ordinary skill in the art would appreciate that an actual display apparatus would includes hundreds, or in some cases, thousands of rows and columns. A more limited number of rows and columns are shown in FIG. 9 merely for illustrative purposes.

Figure 10:
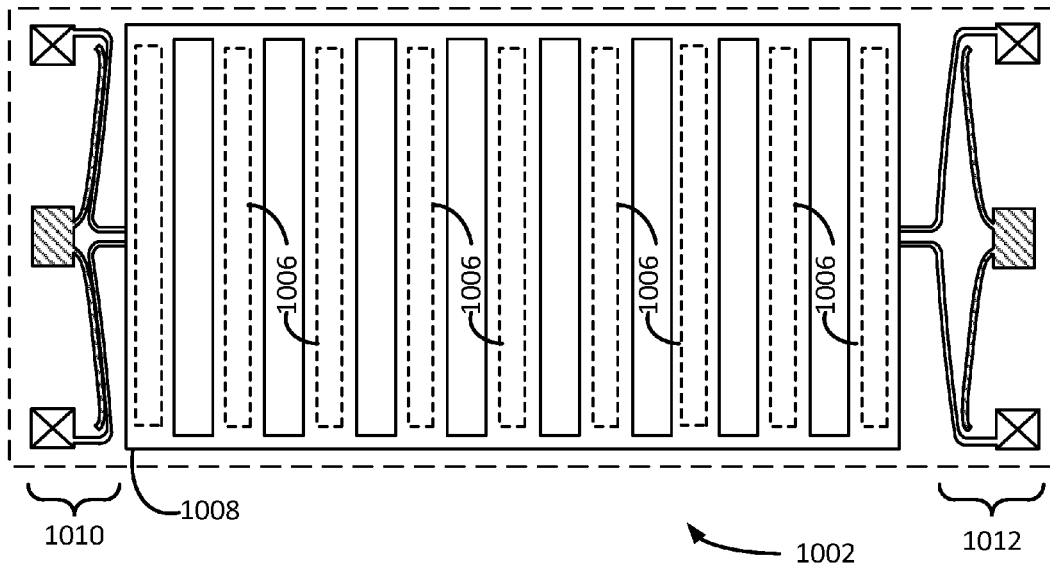
FIG. 10 shows a top view of another example display element of a display apparatus.

FIG. 10 shows a top view of another example display element 1002 of a display apparatus. The display element 1002 is suitable for use as a display element 902 of the display apparatus 900. In contrast with the substantially square shaped display elements 802 and 804 (as shown in FIG. 8), which include in total two sets of actuators 810 and 812 and two shutters 808, the display element 1002 of FIG. 10 includes only a single shutter 1008 and a single set of actuators 1010 and 1012. The additional area made available due to the elimination of two actuators is allocated to additional apertures 1006. For example, the display elements 802 and 804 of FIG. 8 together include a total of six apertures 806. In contrast, the display element 1002 shown in FIG. 10 includes nine apertures. As a result, a display apparatus incorporating display elements similar to the display element 1002 would have a higher aperture ratio than a display apparatus incorporating display elements similar to the display elements 802 or 804.

Similar improvement in the aperture ratio also can be achieved with display elements other than the shutter based display elements shown in FIGS. 8A, 8B and 10. For example, the aperture ratio of an LCD can be improved by combining areas allocated to two adjacent substantially square LCD display elements into a single rectangular LCD display element. In some implementations, each square LCD display element can include sub-pixels for each color, for example, red, green, and blue, and control circuitry associated with each sub-pixel. Therefore, two separate adjacent square LCD display elements would include, in total, six control circuits. By combining the two adjacent square LCD display elements, the combined rectangular LCD display element would include only three control circuit. The elimination of three control circuits provides additional area that can be allocated to increasing the area of the each of the three sub-pixels of the rectangular LCD display element. Thus, a display apparatus incorporating the rectangular LCD display element would have a higher aperture ratio than a display apparatus incorporating the square LCD display elements.

Referring again to FIG. 9, the number of display elements 902 in each row is half the number of display elements 702 in each row of the display apparatus 700 shown in FIG. 7. In other words, the display element density of the display apparatus 900 along a first dimension is reduced to half of that of the display apparatus 700 shown in FIG. 7. However, for the display apparatus 900, the boundaries of adjacent display elements 902 in adjacent rows are misaligned. In particular, the boundaries of adjacent display elements 902 in adjacent rows are staggered or offset by half its length ($DE_X$) in the first dimension. This staggered arrangement results in a viewer, viewing the display apparatus 900, to perceive the display element density along a row (or the first dimension) to be similar to that of a display apparatus having twice the actual display element density in that row. This means that the display apparatus 900 of FIG. 9 can provide substantially the same perceived display element density as display apparatus 700 of FIG. 7, while providing a significantly higher aperture ratio than the display apparatus 700.

While the offset of adjacent display elements 902 in the display apparatus 900 of FIG. 9 is half the length ($DE_X$) of the display element 902 in the first dimension, other values of offset also can be selected. For example, in some implementations, the offset of the adjacent display elements 902 can be one third the length of the display element 902 in the first dimension. In such implementations, each column of the display apparatus 900 can include a display element 902 from every third row. That is, a first column of the display apparatus can include display elements from the rows one, four, seven, . . . , and so on. Similarly, the first row of the display apparatus can include display elements from the columns one, four, seven, . . . , and so on. In some other implementations, the offset can be the length ($DE_X$) multiplied by ¼, ⅔, ⅕, etc. Such offsets would result in display element aspect ratios of 4:1, 3:2, 5:1, etc.

In general, the adjacent display elements in a display apparatus can be staggered or offset in a first dimension by a fraction ($f_X$) of the length ($DE_X$) of the display element. In such implementations, each column can include display elements of every ($1/f_X$)th row. Thus, for example, as shown in FIG. 9, the display element 902 is offset by a fraction equal to ½ of the length ($DE_X$). Therefore each column includes display elements 902 of every $2^{nd}$ row.

In some implementations, the offset can be a function of an aspect ratio of the display element. For example, the rectangular display element 902 can be configured to have aspect ratios such as 2:1 (as shown, for example, in FIG. 9), 3:1, 3:2 and 4:1; and the corresponding offset can be ½, ⅓, ⅔, and ¼, respectively, times the length ($DE_X$) of the display element. A person having ordinary skill in the art will readily understand that other aspect ratios and corresponding offsets also can be used.

A controller provides data signals to each of the display elements 902 of the display apparatus 900. In particular, the controller receives image data, based on which, the controller generates data signals for each of the display elements 902.

In some implementations, the data signals generated by the controller for the display elements 902 of the display apparatus 900 are similar to the data signals generated for the display elements 702 of the display apparatus 700 of FIG. 7. In such implementations, the controller considers the display device 900 to have the same number of pixels as the display device 700 and outputs the same number of data signals accordingly. For example, for an input image frame of the size 4×8 pixels, the controller generates, in total, 32 data signals corresponding to the 32 pixels of the image frame.

The controller communicates the data signals into the display device 900 one row at a time. For the first row R1, the controller communicates eight data signals (corresponding to the eight pixels of the 4×8 image frame) to the display device 900. However, row R1 of the display apparatus 900 includes only four display elements 902 belonging to columns C1, C3, C5 and C7. Thus, when a write-enabling voltage is applied to the first row R1 of display elements 902, only those four display elements are write-enabled. Then, when the data signals are applied to each of the columns C1-C8 of the display apparatus 900, the data signals applied to columns C1, C3, C5 and C7 are stored on corresponding display elements, whereas the data signals applied to columns C2, C4, C6 and C8 are ignored.

Subsequently, the controller can communicate another set of eight data signals for the second row R2. This set of eight data signals can correspond to the eight pixel values of the second row of the 4×8 image frame. The row R2 includes display elements in columns C2, C4, C6 and C8. Therefore, when the data signals for row R2 are applied to each of the columns, only display elements in columns C2, C4, C6 and C8 respond to the data, while the data signals for the remaining columns are ignored. The process continues, with the display apparatus write-enabling and loading data into display elements 902, one row at a time, until all rows of display elements 902 are addressed.

In some other implementations, the controller only outputs data signals for the actual number of display elements 902 included in the display apparatus 900. To do so, when generating data signals for each display element 902, the controller considers a different number of image pixels in a first dimension than in a second dimension. For example, consider an image frame of size 4×8 pixels, having 32 pixel values. The display apparatus 900, however, only includes 16 display elements 902. Thus, to generate a data signal for each display element 902, the controller processes image data corresponding to two image pixels along a first dimension (i.e., along a given row) and one pixel along a second dimension (i.e., down a column). For example, for generating the data signal for the display element R1C1 in the topmost row R1 and the leftmost column C1, the controller considers pixel values in the topmost row and the two leftmost columns of the image frame. Similarly, for generating a data signal for the display element R1C3 in row R1 and column C3, the controller considers the pixel values of image pixels in the third and fourth columns in the first row of the image frame. For another example, consider an image frame including 8×16 pixels. For this image frame, in generating data signals for each display element 902, the controller would process four pixels in the first dimension and two pixels in the second dimension.

To generate a data signal for a display element 902 based on multiple pixel values in a given dimension, in some implementations, the controller can discard the pixel values of all but one of the image pixels in the first dimension. In some such implementations, the controller may switch, every image frame, which of the image pixel values is discarded. In some other implementations, the controller may average the pixel values of the image pixels in the first dimension. In some other implementations, the pixel values can be combined in other suitable ways.

Figure 11A:
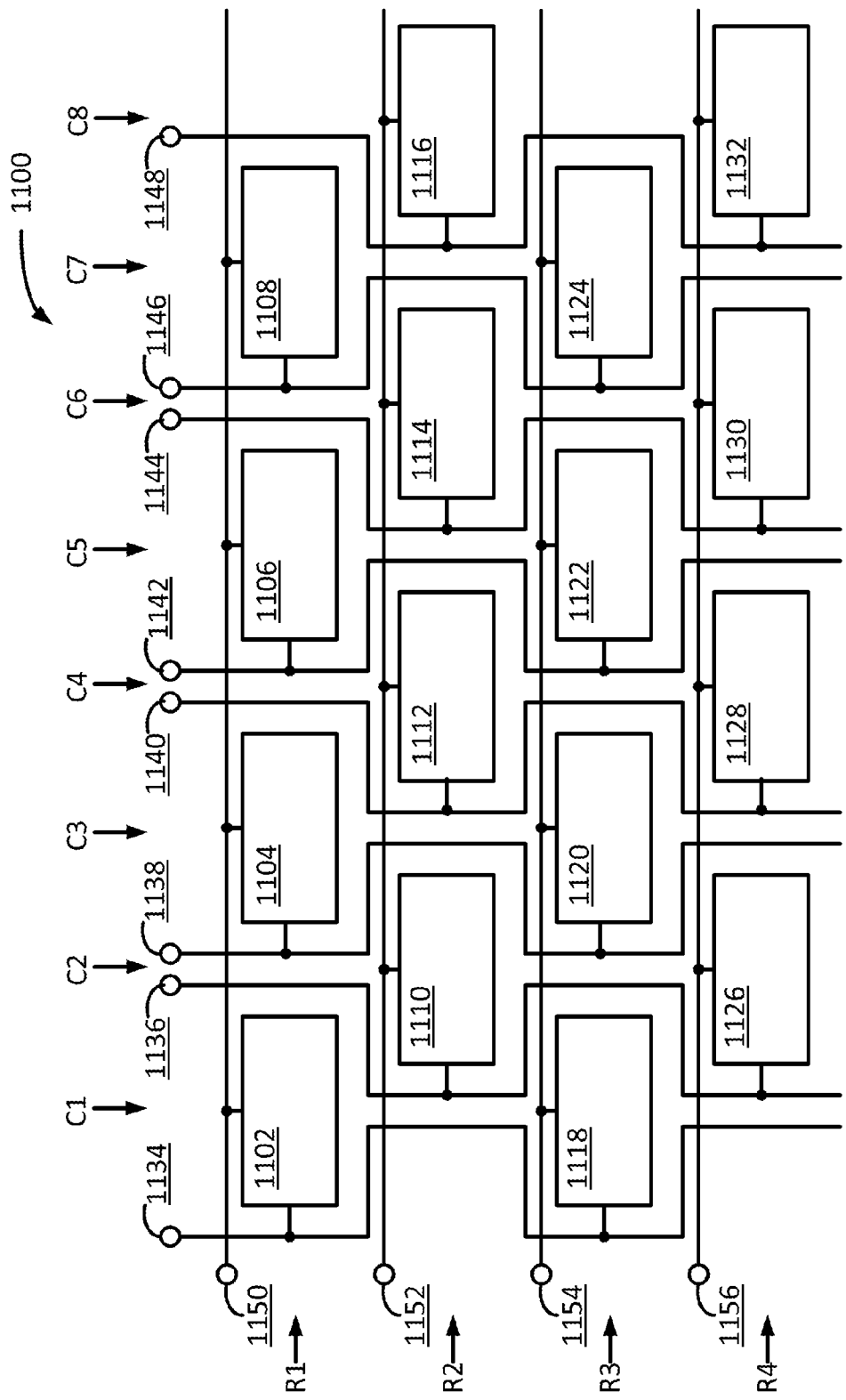
FIGS. 11A-13 show schematic diagrams of example display apparatus.

FIGS. 11A-13 show schematic diagrams of example display apparatus. In particular, FIG. 11A shows a schematic diagram of an example display apparatus 1100. FIG. 11A shows the display apparatus 1100 having an 4×4 array of display elements 1102, 1104, 1106, 1108, 1110, 1112, 1114, 1116, 1118, 1120, 1122, 1124, 1128, 1130 and 1132 arranged in a staggered manner, similar to the display apparatus 900 discussed above in relation to FIG. 9. In addition, FIG. 11A shows data-line interconnects 1134, 1136, 1138, 1140, 1142, 1144, 1146 and 1148 corresponding to the eight columns C1-C8 and scan-line interconnects 1150, 1152, 1154 and 1156 corresponding to the four rows R1-R4. The data-line interconnects 1134, 1136, 1138, 1140, 1142, 1144, 1146 and 1148 and the scan-line interconnects 1150, 1152, 1154 and 1156 are connected to a controller (not shown). Based on image data, the controller appropriately energizes the data-line interconnects 1134, 1136, 1138, 1140, 1142, 1144, 1146 and 1148 and the scan-line interconnects 1150, 1152, 1154 and 1156 to control the state of shutters within each of the display elements 1102, 1104, 1106, 1108, 1110, 1112, 1114, 1116, 1118, 1120, 1122, 1124, 1128, 1130 and 1132.

As mentioned above, the display apparatus 1100 includes eight columns. The data-line interconnect 1134 corresponding to the column C1 is connected to display elements 1102 and 1118; the data-line interconnect 1136 corresponding to column C2 is connected to display elements 1110 and 1126; the data-line interconnect 1138 corresponding to column C3 is connected to display elements 1104 and 1120; the data-line interconnect 1140 corresponding to column C4 is connected to display elements 1112 and 1128; the data-line interconnect 1142 corresponding to column C5 is connected to display elements 1106 and 1122; the data-line interconnect 1144 corresponding to column C6 is connected to display elements 1114 and 1130; the data-line interconnect 1146 corresponding to column C7 is connected to display elements 1108 and 1124; and the data-line interconnect 1148 corresponding to column C8 is connected to display elements 1116 and 1132.

Also as mentioned above, the display apparatus 1100 includes four rows. The scan-line interconnect 1150 corresponding to row R1 is connected to display elements 1102, 1104, 1106 and 1108; the scan-line interconnect 1152 corresponding to row R2 is connected to display elements 1110, 1112, 1114 and 1116; the scan-line interconnect 1154 corresponding to row R3 is connected to display elements 1118, 1120, 1122 and 1124; and the scan-line interconnect 1156 corresponding to row R4 is connected to display elements 1126, 1128, 1130 and 1132.

The data-line interconnects 1134, 1136, 1138, 1140, 1142, 1144, 1146 and 1148 and the scan-line interconnects 1150, 1152, 1154 and 1156 are connected to a controller (not shown). The controller can be similar to the controller 134 discussed above in relation to FIG. 1A. Furthermore, the data signal provided by the controller can be similar to the data signals discussed above in relation to the display elements 902 shown in FIG. 9.

In some implementations, the controller can provide data signals one row at a time. For example, the controller can energize the scan-line interconnect 1150 to enable the display elements 1102, 1104, 1106 and 1108 in row R1 to accept data signals. Subsequently, the controller can energize the data-line interconnects 1134, 1138, 1142 and 1146 with the appropriate data corresponding to display elements 1102, 1104, 1106 and 1108. Similarly, to load data in data elements in row R2, the controller can energize scan-line interconnect 1152 and then energize data-line interconnects 1136, 1140, 1144 and 1148 with data corresponding to row R2 data elements 1110, 1112, 1114 and 1116, respectively. Data can be similarly loaded in data elements corresponding to rows R3 and R4.

In some other implementations, the controller may provide data signals for the display elements in rows R1 and R2 simultaneously. This is possible because data-line interconnects coupled to the display elements of any given row are separate from the data-line interconnects coupled to the display elements of an adjacent row. For example, the data-line interconnects 1134, 1138, 1142 and 1146 coupled to the display elements of row R1 are separate from the data-line interconnects 1136, 1140, 1144 and 1148 coupled to the display elements of row R2. In such implementations, the controller can simultaneously energize scan-line interconnects 1150 and 1152 and then energize all the data-line interconnects 1134, 1136, 1138, 1140, 1142, 1144, 1146 and 1148 to load data into the data elements 1102, 1104, 1108, 1110, 1112, 1114 and 1116 of both rows R1 and R2. In some implementations, the display apparatus 1100 can have a common scan-line interconnect for two adjacent rows. For example, the scan-line interconnects 1150 and 1152 corresponding to rows R1 and R2 can be electrically connected or can be replaced with a single scan-line interconnect coupling to the display elements on either side of the scan-line interconnect. An example of such a display apparatus is shown in FIG. 11B.

Figure 11B:
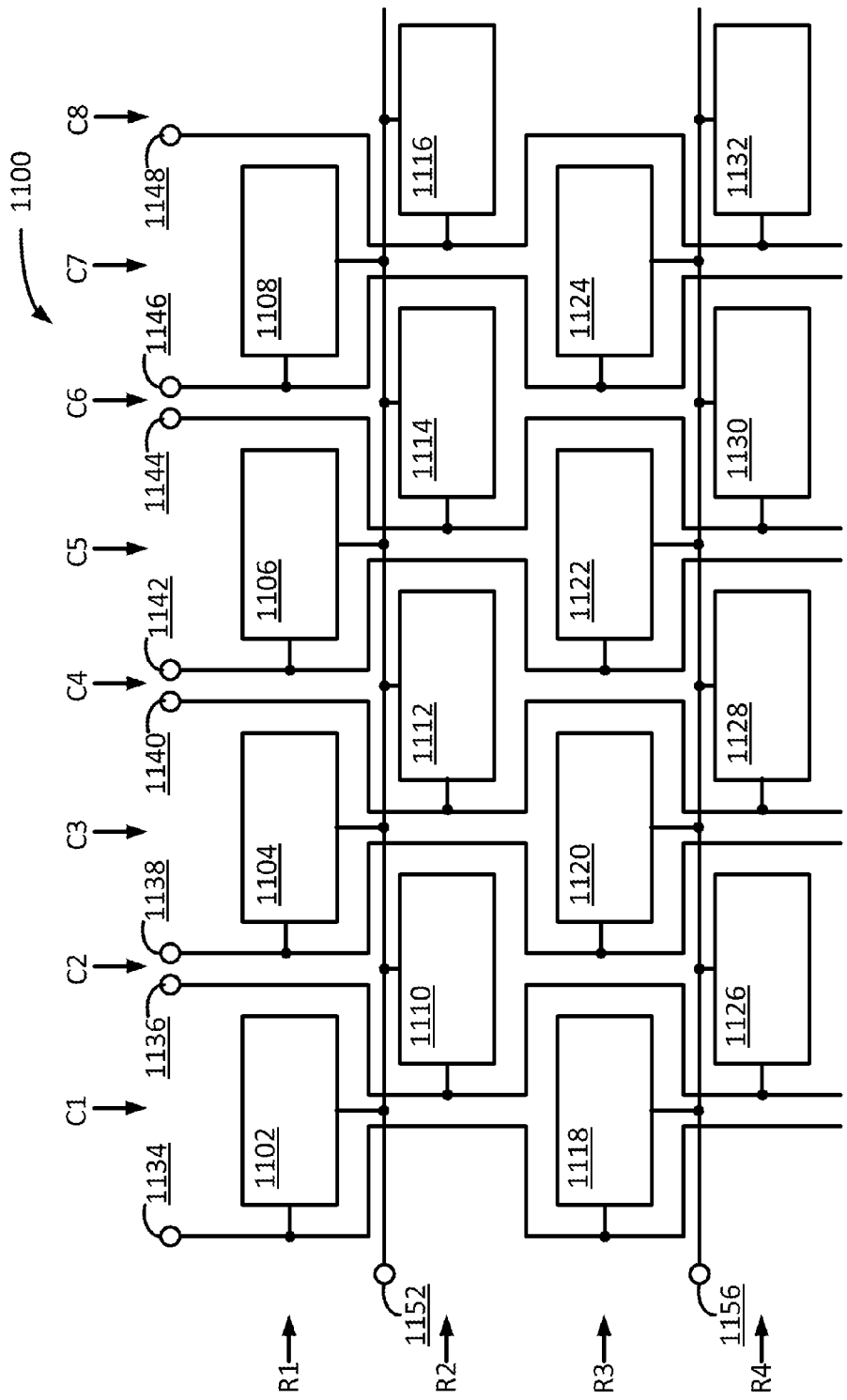

FIG. 11B shows another example schematic diagram of the example display apparatus 1100. As shown in FIG. 11B, each scan-line interconnect is shared among the display elements of two adjacent rows. For example, the scan-line interconnect 1152 is common for, and is coupled to, the display elements 1102, 1104, 1106 and 1108 of row R1 and the display elements 1110, 1112, 1114, and 1116 of row R2. Similarly, the scan-line interconnect 1156 is common for, and is coupled to, the display elements in rows R3 and R4.

Figure 12:
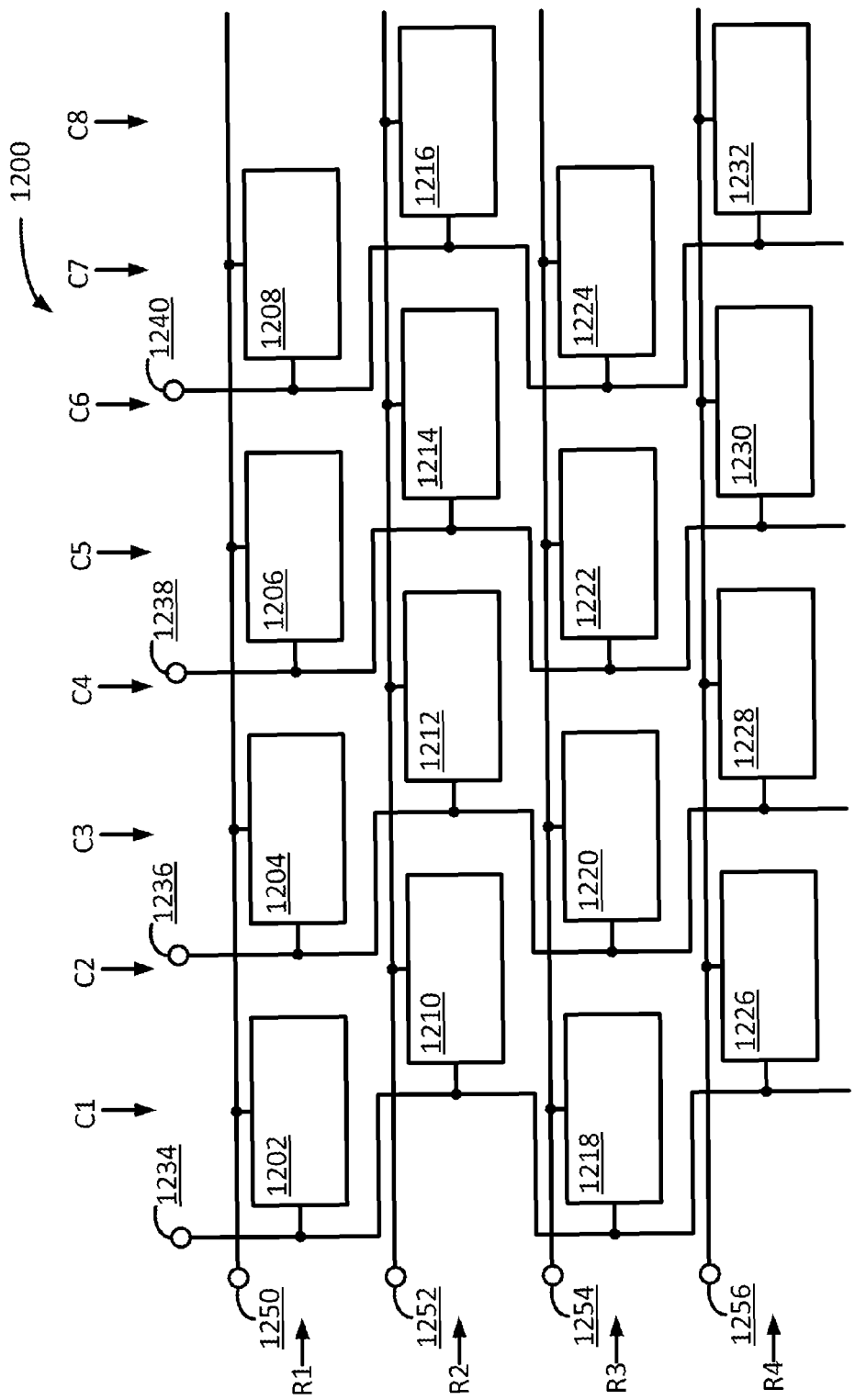

FIG. 12 shows a schematic diagram of another example display apparatus 1200. In particular, FIG. 12 shows the display apparatus 1200 having an 4×8 array of display elements 1202, 1204, 1206, 1208, 1210, 1212, 1214, 1216, 1218, 1220, 1222, 1224, 1226, 1228, 1230 and 1232 arranged in a staggered manner, similar to the display apparatus 900 discussed above in relation to FIG. 9. In addition, FIG. 12 shows scan-line interconnects 1250, 1252, 1254 and 1256 corresponding to the four rows R1-R4. The display apparatus 1200 includes four data-line interconnects 1234, 1236, 1238 and 1240 where each data-line interconnect corresponds to two columns. For example, the data-line interconnect 1234 is coupled to display elements 1202 and 1218 of column C1 and display elements 1210 and 1226 of column C2; the data-line interconnect 1236 is coupled to display elements 1204 and 1220 of column C3 and display elements 1212 and 1228 of column C4; the data-line interconnect 1238 is coupled to display elements 1206 and 1222 of column C5 and display elements 1214 and 1230 of column C6; and the data-line interconnect 1240 is coupled to display elements 1208 and 1224 of column C7 and display elements 1216 and 1232 of column C8. The data-line interconnects 1234, 1236, 1238 and 1240 and the scan-line interconnects 1250, 1252, 1254 and 1256 are connected to a controller (not shown). Based on image data, the controller appropriately energizes the data-line interconnects 1234, 1236, 1238 and 1240 and the scan-line interconnects 1250, 1252, 1254 and 1256 to control the state of shutters within each of the display elements.

The scan-line interconnect 1250 corresponding to the row R1 is connected to display elements 1202, 1204, 1206 and 1208; the scan-line interconnect 1252 corresponding to the row R2 is connected to display elements 1210, 1212, 1214 and 1216; scan-line interconnect 1254 corresponding to the row R3 is connected to display elements 1218, 1220, 1222 and 1224; and scan-line interconnect 1254 corresponding to the row R4 is connected to display elements 1226, 1228, 1230 and 1232.

For the display apparatus 1200, the controller can load data to the display elements only one row at time. Thus, to load data into the display elements of row R1, the controller can energize the scan-line interconnect 1250 and, based on image data, can appropriately energize data-line interconnects 1234, 1236, 1238 and 1240 to load data in display elements 1202, 1204, 1206 and 1208 respectively. The data for display elements of the remaining rows R2-R4 can be similarly loaded by energizing the corresponding scan-line interconnects.

Furthermore, the data signal provided by the controller can be similar to the data signals discussed above in relation to the display elements 902 shown in FIG. 9. In particular, the controller can generate data signals for each display element 1202, 1204, 1206, 1208, 1210, 1212, 1214, 1216, 1218, 1220, 1222, 1224, 1226, 1228, 1230 and 1232 using a first number of image pixels in the first dimension and a second number of image pixels in the second dimensions, where the first number is greater than the second number.

Figure 13:
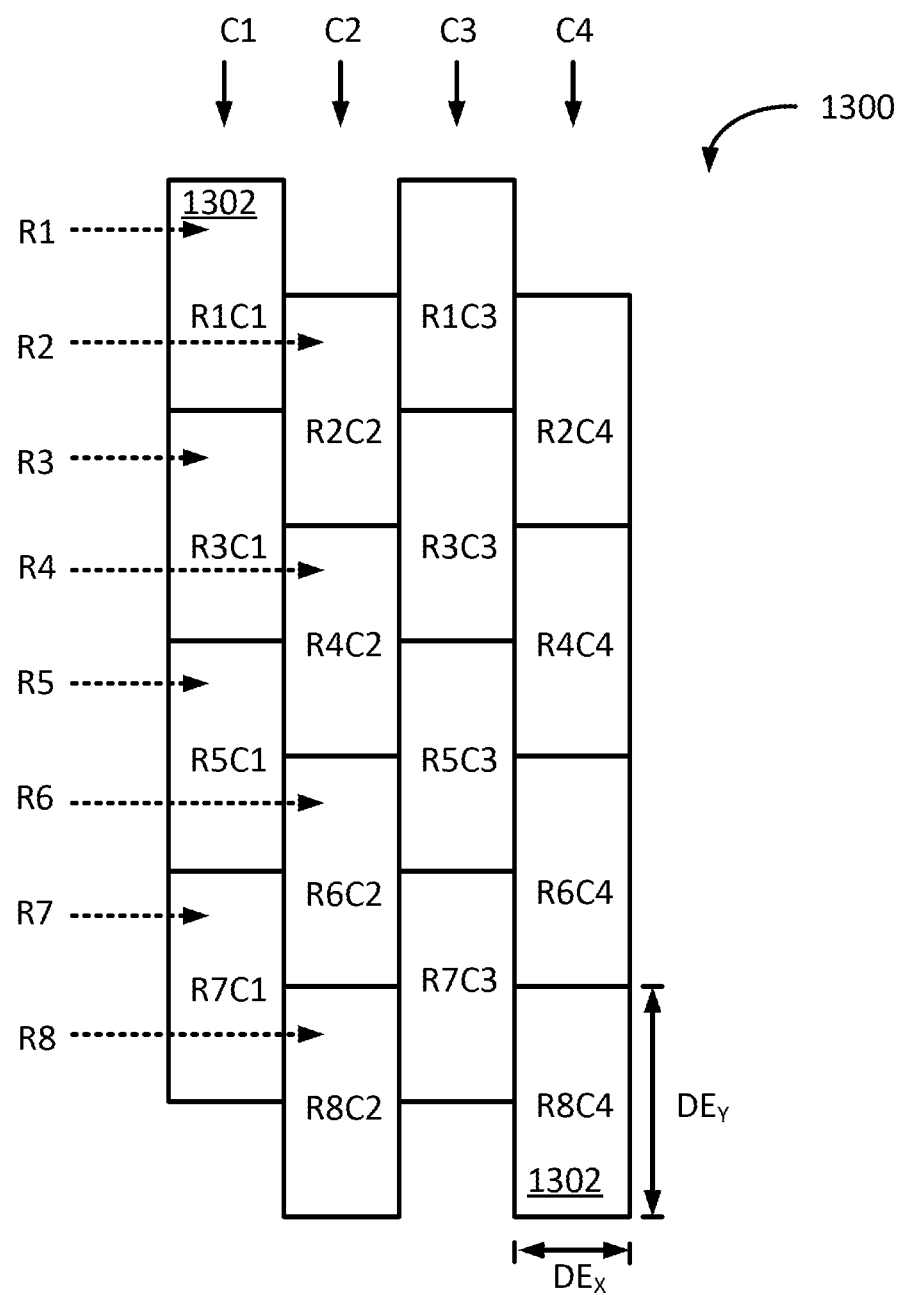

FIG. 13 shows a schematic diagram of display elements of an example display apparatus 1300. In particular, the display elements 1302 of the display apparatus 1300 are arranged in a staggered manner. Unlike the display apparatus 900 shown in FIG. 9, in which the display elements 902 are staggered or offset along the first dimensions, the display elements 1302 of the display apparatus 1300 are staggered or offset along the second dimension. The boundaries of the areas allocated to two adjacent display elements 1302 in adjacent columns are offset by half the average length ($DE_Y$) of the area allocated to the display element 1302 in the second dimension. Because of the offset, the perceived display element density of the display apparatus 1300 along the second dimension is substantially twice the actual display element density along the second dimension. In some implementations, the average length ($DE_X$) of the area allocated to the display elements 1302 in the first dimension is half the average length ($DE_Y$) of the area allocated to the display element 1302 in the second dimension. For example, the length $DE_Y$ of the display element 1302 in the second dimension can be about 60-200 microns while its length $DE_X$ in the first dimension can be about 30-100 microns.

The display element 1302 can be similar to the display element 902 (as shown in FIG. 9) or the display element 1002 (as shown in FIG. 10) discussed above. As such, each display element 1302 can include a larger number of apertures for a single shutter and a set of actuators and actuation circuitry. The display apparatus 1300 includes four columns C1-C4 and eight rows R1-R8. Each column includes four display elements 1302 while each row includes two display elements 1302. A person having ordinary skill in the art will readily understand that the display apparatus 1300 may include any number of rows, columns, and display elements.

The display apparatus 1300 is coupled to a controller (not shown), which provides data signals for each of the display elements 1302 based on received image data. In some implementations, the controller can provide data signals to the display apparatus 1300 one row at a time. As such, the controller can generate data signals in a manner similar to the one described above in relation to the display apparatus 900 of FIG. 9. For example, controller can generate data signals corresponding to all the columns of the display apparatus 1300 when enabling each row. For example, the controller can enable rows R1-R8, one row at a time, by energizing the corresponding scan-line interconnects. Then, with one row enabled, for example row R1, the controller can energize the four data-line interconnects corresponding to all four columns C1-C4. However, as the row R1 includes display elements 1302 corresponding to only columns C1 and C3, the scan-line interconnect for row R1 will enable display elements 1302 in these two columns only (i.e., display elements labeled R1C1 and R1C3). Data signals on data-line interconnects corresponding to columns C2 and C4 will be ignored because row R2 is not enabled. Similarly, when accepting data for display elements 1302 in row R2, only the display elements R2C2 and R2C4 in columns C2 and C4 will accept data. Data signals on data-line interconnects corresponding to columns C1 and C3 will not be accepted by any display elements.

Similar to the display apparatus 900 of FIG. 9, the adjacent display elements in a display apparatus can be staggered or offset in the second dimension by a fraction ($f_Y$) of the length ($DE_Y$) of the display element. In such implementations, each row can include display elements of every ($1/f_Y$)th column. Thus, for example, as shown in FIG. 13, the display element 1302 is offset by a fraction equal to (½) of the length ($DE_Y$), therefore each row includes display elements 1302 of every $2^{nd}$ column.

In some implementations, the offset can be a function of the aspect ratio of the display element. For example, the rectangular display element 1302 can be configured to have aspect ratios such as 2:1 (as shown, for example, in FIG. 13), 3:1, 3:2 and 4:1; and the corresponding offset can be (½), (⅓), (⅔) and (¼), respectively, times the length ($DE_Y$) of the display element. A person having ordinary skill in the art will readily understand that other aspect ratios and corresponding offsets also can be used depending on the intended design.

In some other implementations, for generating each data signal, the controller uses a number of image pixels in the second dimension that is greater than the number of image pixels used in the first dimension. For example, for a 8×4 image frame, the image data includes pixel values of each of the 32 image pixels of the image frame. To generate the data signal for the display element 1302 in row R1 and column C1, the controller uses values of two image pixels from the first two rows along the leftmost column of the image frame. Similarly, for generating the data signal for the display element 1302 in row R3 and column C1, the controller uses values of two image pixels, one from the third and one from the fourth row along the leftmost column of the image frame.

Thus, the display apparatus 1300 provides display elements with high aperture ratio without sacrificing the perceived display element density of the display apparatus 1300.

In some implementations, the offset by which adjacent display elements 1302 in adjacent columns are staggered is a different fraction of the average length of the display element in the second dimension. For example, the offset can be equal to a third of the average length, $DE_y$, of the area allocated to the display element 1302 in the second dimension. In such implementations, each row includes display elements from every third column of the display apparatus. Furthermore, the controller considers pixel values of three image pixels in the second dimension to generate the data signal for each display element 1302.

In general, the controller can consider the pixel values of a first number of image pixels in the first dimension and the pixel values of a second number of image pixels in the second dimension of the image frame in generating data signals for each of the display elements 1302 of the display apparatus 1300. In such implementations, the offset between adjacent display elements 1302 in two adjacent columns can be selected to be equal to the average length, $DE_y$, of the area allocated to the display element 1302 multiplied by a ratio of the first number of image pixels to the second number of image pixels. In such implementations, each row can include display elements 1302 of every nth column, where n is equal to a ratio of the second number of image pixels to the first number of image pixels.

The display apparatus 1300 also can include scan-line interconnects and data-line interconnects which are used by the controller to provide data signals to each of the display elements 1302. Such interconnects can be configured in a manner similar to the ones shown above in relation to FIGS. 11 and 12. In some implementations, the scan-line interconnect can be configured such that one scan-line interconnect is shared by display elements of at least two rows of the display apparatus.

Figure 14A:
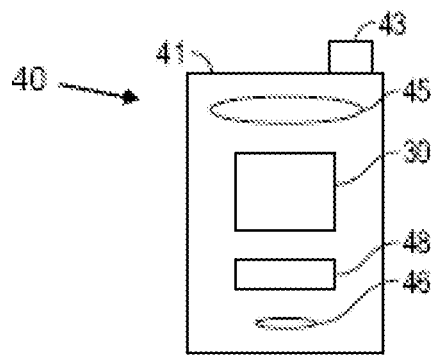
FIGS. 14A and 14B are system block diagrams illustrating an example display device that includes a plurality of display elements.
Figure 14B:
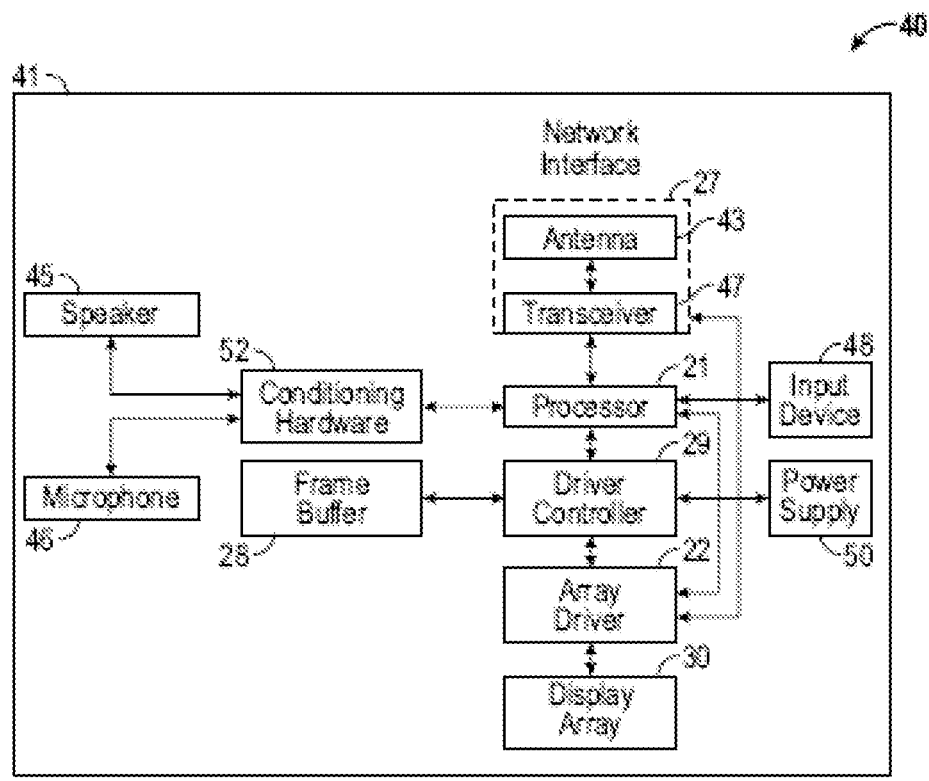

FIGS. 14A and 14B are system block diagrams illustrating a display device 40 that includes a plurality of display elements. The display device 40 can be, for example, a smart phone, a cellular or mobile telephone. However, the same components of the display device 40 or slight variations thereof are also illustrative of various types of display devices such as televisions, computers, tablets, e-readers, hand-held devices and portable media devices.

The display device 40 includes a housing 41, a display 30, an antenna 43, a speaker 45, an input device 48 and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, electroluminescent (EL) displays, OLED, super twisted nematic (STN) display, LCD, or thin-film transistor (TFT) LCD, or a non-flat-panel display, such as a cathode ray tube (CRT) or other tube device. In addition, the display 30 can include a mechanical light modulator-based display, as described herein.

The components of the display device 40 are schematically illustrated in FIG. 14A. The display device 40 includes a housing 41 and can include additional components at least partially enclosed therein. For example, the display device 40 includes a network interface 27 that includes an antenna 43 which can be coupled to a transceiver 47. The network interface 27 may be a source for image data that could be displayed on the display device 40. Accordingly, the network interface 27 is one example of an image source module, but the processor 21 and the input device 48 also may serve as an image source module. The transceiver 47 is connected to a processor 21, which is connected to conditioning hardware 52. The conditioning hardware 52 may be configured to condition a signal (such as filter or otherwise manipulate a signal). The conditioning hardware 52 can be connected to a speaker 45 and a microphone 46. The processor 21 also can be connected to an input device 48 and a driver controller 29. The driver controller 29 can be coupled to a frame buffer 28, and to an array driver 22, which in turn can be coupled to a display array 30. One or more elements in the display device 40, including elements not specifically depicted in FIG. 14A, can be configured to function as a memory device and be configured to communicate with the processor 21. In some implementations, a power supply 50 can provide power to substantially all components in the particular display device 40 design.

The network interface 27 includes the antenna 43 and the transceiver 47 so that the display device 40 can communicate with one or more devices over a network. The network interface 27 also may have some processing capabilities to relieve, for example, data processing requirements of the processor 21. The antenna 43 can transmit and receive signals. In some implementations, the antenna 43 transmits and receives RF signals according to the IEEE 16.11 standard, including IEEE 16.11(a), (b), or (g), or the IEEE 802.11 standard, including IEEE 802.11a, b, g, n, and further implementations thereof. In some other implementations, the antenna 43 transmits and receives RF signals according to the Bluetooth® standard. In the case of a cellular telephone, the antenna 43 can be designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HS-DPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G, 4G or 5G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, in some implementations, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that can be readily processed into raw image data. The processor 21 can send the processed data to the driver controller 29 or to the frame buffer 28 for storage.

Raw data typically refers to the information that identifies the image characteristics at each location within an image. For example, such image characteristics can include color, saturation and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of display elements. In some implementations, the array driver 22 and the display array 30 are a part of a display module. In some implementations, the driver controller 29, the array driver 22, and the display array 30 are a part of the display module.

In some implementations, the driver controller 29, the array driver 22, and the display array 30 are appropriate for any of the types of displays described herein. For example, the driver controller 29 can be a conventional display controller or a bi-stable display controller (such as a mechanical light modulator display element controller). Additionally, the array driver 22 can be a conventional driver or a bi-stable display driver (such as a mechanical light modulator display element controller). Moreover, the display array 30 can be a conventional display array or a bi-stable display array (such as a display including an array of mechanical light modulator display elements). In some implementations, the driver controller 29 can be integrated with the array driver 22. Such an implementation can be useful in highly integrated systems, for example, mobile phones, portable-electronic devices, watches or small-area displays.

In some implementations, the input device 48 can be configured to allow, for example, a user to control the operation of the display device 40. The input device 48 can include a keypad, such as a QWERTY keyboard or a telephone keypad, a button, a switch, a rocker, a touch-sensitive screen, a touch-sensitive screen integrated with the display array 30, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices. For example, the power supply 50 can be a rechargeable battery, such as a nickel-cadmium battery or a lithium-ion battery. In implementations using a rechargeable battery, the rechargeable battery may be chargeable using power coming from, for example, a wall socket or a photovoltaic device or array. Alternatively, the rechargeable battery can be wirelessly chargeable. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus, comprising:
   an array of display elements, each display element configured to selectively control an output of light corresponding to a first number of pixels of an image frame along a first dimension and a second, smaller number of pixels of the image frame along a second dimension, and
   a controller coupled to the array of display elements, the controller configured to provide control signals to each display elements to cause the display element to output light based on a field sequential color image formation process, and a relationship between the first number of pixels along the first dimension and the second smaller number of pixels along a second dimension,
   wherein the positions of areas allocated to adjacent display elements are offset in the first dimension.

2. The apparatus of claim 1, further comprising:
   a plurality of scan-line interconnects,
   wherein the scan-line interconnects are configured to be routed between areas allocated to adjacent display elements, and
   wherein the array of display elements includes rows and columns of display elements, and wherein the rows are arranged along the first dimension.

3. The apparatus of claim 1, further comprising:
   a plurality of data-line interconnects,
   wherein the data-line interconnects are configured to be routed between areas allocated to adjacent display elements, and
   wherein the array of display elements includes rows and columns of display elements, and wherein the columns are arranged along the first dimension.

4. The apparatus of claim 1, wherein the display elements have an average length along the first dimension and an average length along the second dimension, and wherein the average length along the first dimension is greater than the average length along the second dimension.

5. The apparatus of claim 1, wherein each display element is allocated an area having a length in the first dimension, and wherein the positions are offset by the length multiplied by a ratio of the second number over the first number.

6. The apparatus of claim 1, further comprising data-line interconnects, wherein each data-line interconnect couples only to display elements on every nth row, wherein n is equal to a ratio of the first number over the second number.

7. The apparatus of claim 1, further comprising a plurality of scan-line interconnects, wherein each scan-line interconnect couples to display elements in a given row of the apparatus, and wherein the scan-line interconnects associated with two adjacent rows are configured to concurrently provide write enabling signals to the coupled display elements.

8. The apparatus of claim 1, further comprising a plurality of scan line interconnects, wherein each scan-line interconnect couples to display elements in two adjacent rows.

9. The apparatus of claim 1, wherein a first length associated with an area allocated to each display element, along the first dimension, is twice a second length associated with the area allocated to each display element along the second dimension.

10. The apparatus of claim 1, wherein each display element includes a microelectromechanical (MEMS) shutter.

11. The apparatus of claim 1, wherein the display elements include liquid crystal light modulators.

12. The apparatus of claim 1, further comprising:
a display including the array of display elements;
a processor that is configured to communicate with the display, the processor being configured to process image data; and
a memory device that is configured to communicate with the processor.

13. The apparatus of claim 12, further comprising:
a driver circuit configured to send at least one signal to the display; and
a controller configured to send at least a portion of the image data to the driver circuit.

14. The apparatus of claim 12, further comprising:
an image source module configured to send the image data to the processor, wherein the image source module includes at least one of a receiver, transceiver, and transmitter.

15. The apparatus of claim 12, further comprising:
an input device configured to receive input data and to communicate the input data to the processor.

16. The apparatus of claim 1, wherein an aspect ratio of each display element is equal to at least one of 2:1, 3:1 and 3:2.

17. An apparatus, comprising:
an array of display elements having a first display element density in a first dimension and a second display element density in a second dimension such that the second display element density is different than the first display element density, and
a controller coupled to the array of display elements, the controller configured to provide control signals to each display elements to cause the display element to output light based on a field sequential color image formation process,
wherein areas allocated to adjacent display elements are offset in the first dimension,
wherein the area allocated to each display element has an aspect ratio defined by the ratio of a length of the area in the first dimension and a length of the area in the second dimension, and wherein the offset is equal to the length of the area in the first dimension times the inverse of the aspect ratio.

18. The apparatus of claim 17, wherein the array of display elements includes rows and columns of display elements, and wherein the rows or the columns are arranged along the first dimension.

19. The apparatus of claim 17, wherein the display elements have an average length along the first dimension and an average length along the second dimension, and wherein the average length along the first dimension is twice the average length along the second dimension.

20. The apparatus of claim 17, wherein the areas allocated to adjacent display elements are offset in the first dimension by a fraction of an average length of the display elements along the first dimension.

21. The apparatus of claim 17, wherein the display elements have an aspect ratio substantially equal to at least one of 2:1, 3:1, and 3:2.

22. The apparatus of claim 17, wherein the display elements include liquid crystal light modulators.

23. An apparatus, comprising:
a plurality of light modulating means for outputting light arranged in an array having a first dimension and a second dimension such that areas allocated to adjacent light modulating means are offset in a first dimension; and
a controlling means for controlling, based on a field sequential color image formation process, an output of light from each of the plurality of light modulating means based on a first number of pixels of an image frame along a first dimension and a second, smaller number of pixels of the image frame along a second dimension.

24. The apparatus of claim 23, wherein the array of the plurality of light modulating means includes rows and columns of light modulating means, and wherein the rows are arranged along the first dimension.

25. The apparatus of claim 24, further comprising at least one of:
a plurality of write enabling means for enabling the plurality of light modulating means to respond to data signals associated with an image frame, wherein the write-enabling means are positioned between areas allocated to adjacent light modulating means; and
a plurality of data providing means for providing data signals from the controlling means to the light modulating means, wherein the data providing means are positioned between areas allocated to adjacent light modulating means.

26. The apparatus of claim 25, wherein each of the plurality of write enabling means is configured for simultaneously write-enabling two rows of light modulating means.

27. The apparatus of claim 23, wherein the areas allocated to adjacent light modulating means are offset in the first dimension by a fraction of an average length of the light modulating means along the first dimension.

* * * * *